(12) United States Patent
Brick et al.

(10) Patent No.: US 12,319,327 B2
(45) Date of Patent: *Jun. 3, 2025

(54) SYSTEM AND METHOD FOR STRATEGIC TRACK AND MAINTENANCE PLANNING INSPECTION

(71) Applicant: BNSF Railway Company, Fort Worth, TX (US)

(72) Inventors: Michael James Brick, Fort Worth, TX (US); Samuel Minton, Brandon, SD (US); Christopher Neil Pickard, Argyle, TX (US); Phillip Hunt, Saginaw, TX (US); Benjamin Klein, Saginaw, TX (US); Francis Showry Polisetty, Grapevine, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,307

(22) Filed: May 20, 2022

(65) Prior Publication Data
US 2022/0324497 A1    Oct. 13, 2022

Related U.S. Application Data

(63) Continuation of application No. 17/301,659, filed on Apr. 9, 2021, now Pat. No. 11,364,943.

(51) Int. Cl.
*B61L 23/04* (2006.01)
*G05B 23/02* (2006.01)

(52) U.S. Cl.
CPC .......... *B61L 23/042* (2013.01); *G05B 23/024* (2013.01); *G05B 23/0283* (2013.01)

(58) Field of Classification Search
CPC .. B61L 23/042; G05B 23/024; G05B 23/0283
See application file for complete search history.

(56) References Cited

U.S. PATENT DOCUMENTS 5,978,717 A    11/1999    Ebersoehn et al.
7,805,227 B2    9/2010    Welles et al.
(Continued)

OTHER PUBLICATIONS

CN-111391881, Fang, English Translation, (Year: 2020).*
(Continued)

*Primary Examiner* — Michael J Dalbo
(74) *Attorney, Agent, or Firm* — Whitaker Chalk Swindle & Schwartz PLLC; Enrique Sanchez, Jr.; Juan Vasquez

(57) ABSTRACT

A system and method for strategic track and maintenance planning (STAMP) that can provide an organizational and adaptive infrastructure configured to facilitate railroad asset management and capital planning is presented. The system can provide a railroad asset inspector with relevant data for an assigned inspection segment. Location-based functionality can acquire a device's precise location and provide only the data necessary for the inspection of a particular railroad asset by providing step-by-step input prompting based upon the device location. The system provides adaptive thresholding of asset-related criteria to determine whether and when asset maintenance should occur. The system can acquire inspection data for one or more railroad assets, apply a data optimization algorithm to the inspection data, analyze railroad asset-related data (including historical data), and generate an optimized capital plan with a schedule for railroad asset maintenance and replacement.

14 Claims, 16 Drawing Sheets

(56) References Cited

U.S. PATENT DOCUMENTS

| | | | |
|---|---|---|---|
| 7,832,638 | B2 | 11/2010 | Wetzel et al. |
| 8,576,069 | B2 | 11/2013 | Nadeem et al. |
| 9,036,861 | B2 | 5/2015 | Chen et al. |
| 9,810,533 | B2 | 11/2017 | Fosburgh et al. |
| 10,086,857 | B2 | 10/2018 | Puttagunta et al. |
| 11,364,943 | B1* | 6/2022 | Brick .................... B61L 23/042 |
| 2002/0156558 | A1 | 10/2002 | Hanson et al. |
| 2005/0023347 | A1* | 2/2005 | Wetzel .................... G07C 1/20 |
| | | | 235/385 |
| 2009/0237245 | A1* | 9/2009 | Brinton .................... G08G 1/20 |
| | | | 340/540 |
| 2010/0057512 | A1 | 3/2010 | Tays et al. |
| 2010/0299179 | A1* | 11/2010 | Alonso .............. G06Q 10/0637 |
| | | | 280/727 |
| 2011/0282540 | A1 | 11/2011 | Artimage et al. |
| 2014/0207862 | A1* | 7/2014 | Domke .................. G06Q 10/06 |
| | | | 709/204 |
| 2016/0078695 | A1 | 3/2016 | McClinton et al. |
| 2016/0225130 | A1* | 8/2016 | Venkatesha ............ G01B 11/02 |
| 2018/0032068 | A1* | 2/2018 | Higgins .................... B64F 5/60 |
| 2018/0276494 | A1 | 9/2018 | Fernandez |
| 2019/0012627 | A1 | 1/2019 | Martin |

OTHER PUBLICATIONS

Bye, Richard, Designing mobile user experiences: disruptive innovation in railway asset information, Feb. 19, 2013.

Wolfgang Kluth, Karl-Heinz Krempels, Christoph Terwelp, Stefan Wüller, Increase of travel safety for public transport by mobile applications, Jul. 29, 2013.

Mehmet Karakose, Orhan Yaman, Mehmet Baygin, Kagan Murat, Erhan Akin, A new computer vision based method for rail track detection and fault diagnosis in railways, Jan. 31, 2017.

Marcus Foth, Ronald Schroeter, Irina Anastasiu, Fixing the city one photo at a time: mobile logging of maintenance requests, Nov. 28, 2011.

PCT International Patent Application No. PCT/US2022/018128, dated Jun. 14, 2022, International Search Report and Written Opinion, 15 pages.

\* cited by examiner

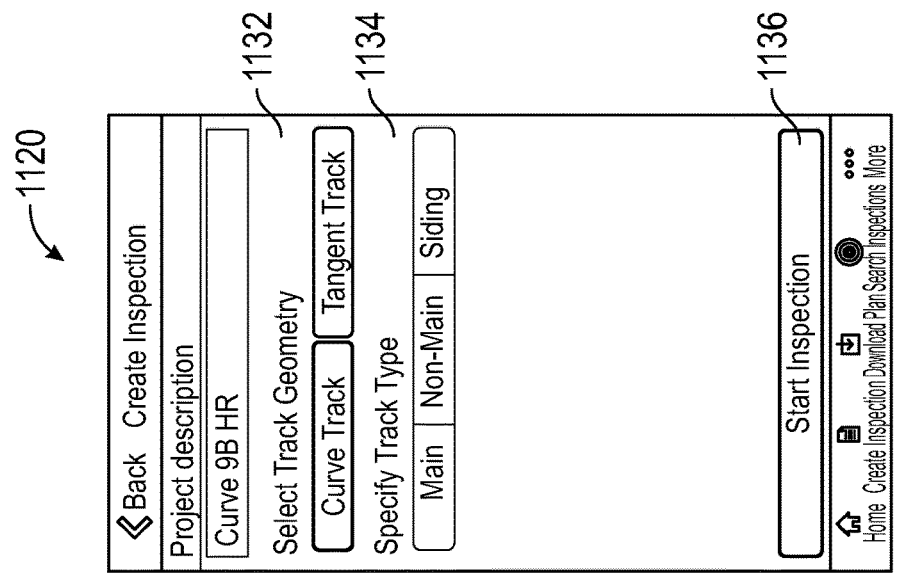
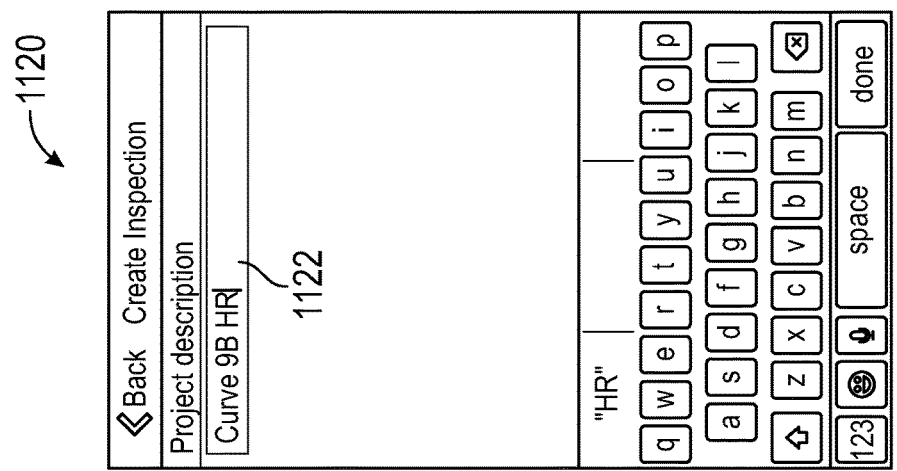
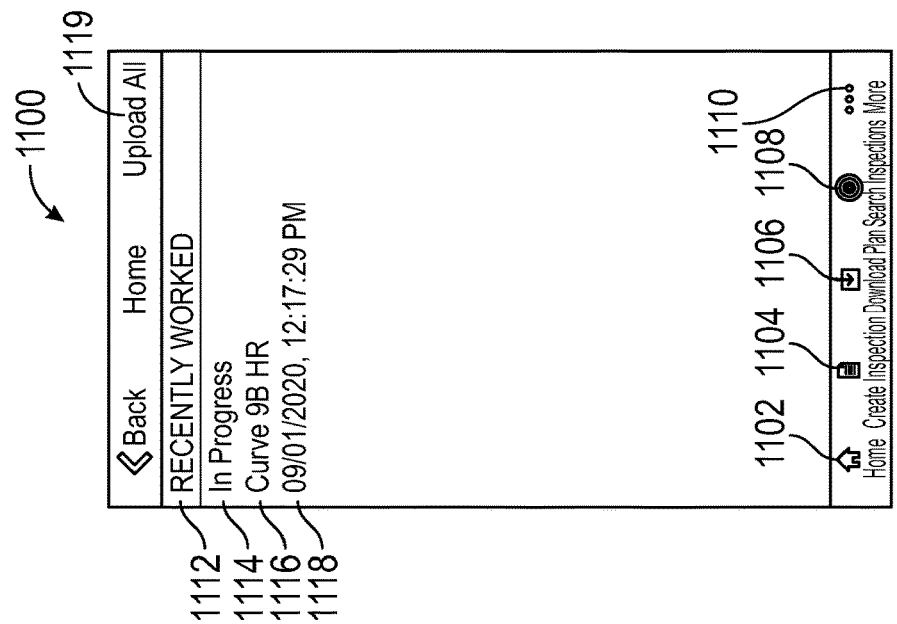
FIG. 11C
FIG. 11B
FIG. 11A

┌─ 1300                          ┌─ 1300
                                                    │                                │
         ```
         ≪Back      Body      Pause            ≪Back      Body      Pause
1302 ─── Body Rail Year Rolled?                Body Rail Manufacturer
         [ 2000                          ]     [ Algoma Steel Corporation    ⌄ ]
1304 ─── Body Rail Manufacturer                Body Rail Weight
         [ Algoma Steel Corporation   ⌄ ]      [ 136                          ⌄ ]
1308 ─── Body Rail Weight                      Body Vertical Head Loss
         [ 136                         ⌄ ]     [ 1/8"                         ⌄ ]
1310 ─── Body Vertical Head Loss               Body Gauge Face Loss
         [ 1/8"                        ⌄ ]     [ 9/16"                        ⌄ ]
1312 ─── Body Gauge Face Loss           1314 ─ Select Tie Type
         [                             ⌄ ]     [  Wood  ]      [  Concrete  ]
                                        1316 ─ Select Wood Fastener
                                               [ Cut Spikes ]  [  Pandrol   ]
                                        1318 ─ Need full plate change?
                                               [   Yes   ]     [    No      ]

▶   ⚒   ⚒   ⚒   🖼            ▶   ⚒   ⚒   ⚒   🖼
        Begin Body End Finalize Picture       Begin Body End Finalize Picture
         ```

FIG. 13A                              FIG. 13B

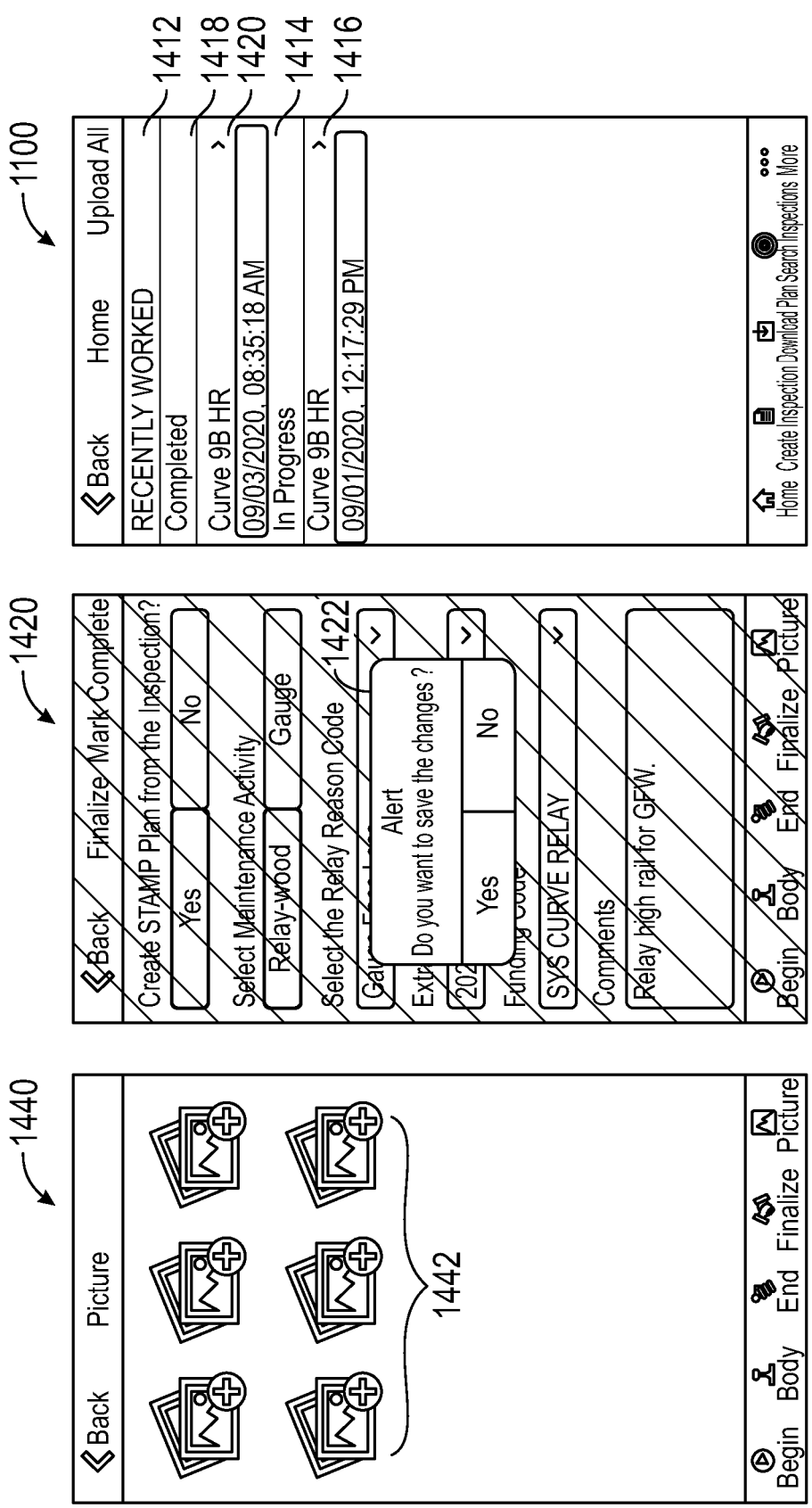

SYSTEM AND METHOD FOR STRATEGIC TRACK AND MAINTENANCE PLANNING INSPECTION

CROSS-REFERENCE TO RELATED APPLICATIONS

The present application is a Continuation Application of U.S. patent application Ser. No. 17/301,659, filed on Apr. 9, 2021, entitled "SYSTEM AND METHOD FOR STRATEGIC TRACK AND MAINTENANCE PLANNING INSPECTION," the contents of which are incorporated herein in their entireties for all purposes.

TECHNICAL FIELD

The present disclosure relates generally to the management of railroad assets, particularly systems and methods for strategic track and maintenance planning asset management for railroad assets disposed throughout a railroad system infrastructure.

BACKGROUND

Generally speaking, railroad asset maintenance is a tedious task requiring documentation of manual inspections of railroad assets. Railroad asset inspection is typically rife with erroneous data capture, resulting in wasted resources due to over-order of parts and material, or under-ordering of parts and material resulting in duplicative work to cover the under-order.

Creating an inspection also requires experience identifying assets and understanding the jargon that accompanies those assets. For example, a railroad track can be tangent or curved, of the two rails in a curve, on rail is the high rail while the other is the low rail. The railroad tracks also contain many components that comprise the track with corresponding characteristics. A proper inspection can require the close examination and documentation of many components and conditions. If one component or condition is missed or mischaracterized, safety can become an issue.

While organizational methods and specialized equipment can be useful in gathering and managing information about railroad assets, inspection process are still manual and archaic. Railroad personnel are still required to inspect those assets and make the final decision as to whether the asset should be replaced. Such personnel can misplace notes, improperly document measurements, and require periodic training. Generation of capital plans that allocate capital for the maintenance of railroad assets can be near impossible to accurately generate if based on inaccurate information. And the decision of whether to replace an asset can be subjective without any uniformity.

SUMMARY

The present disclosure achieves technical advantages as a system and method for strategic track and maintenance planning (STAMP) that can provide an organizational and adaptive infrastructure configured to facilitate railroad asset management and capital planning. The system enables the logging of an adaptive inspection for the asset that is being inspected (e.g., Rails, Ties, Ballasts, Turnouts, Crossings, etc.). The system can step-wise guide a user to conduct a detailed inspection of a wide variety of railroad assets to capture a list of data points characterizing an asset, as well as analyze the data points to evaluate whether the asset should be replaced and accounted for in a capital plan. The system can utilize GPS coordinates from clients/devices in the field to retrieve asset information from a GIS database, part database, price database, or other suitable database. The system also provides for the acquisition and upload of asset pictures for a particular inspection. The inspection can be used to directly generate capital plans, and provide a customizable user interface to identify, characterize, and process information related to virtually any railroad asset.

The present disclosure solves the technological problem of providing a railroad asset inspector with a system configured to generate step-wise prompts based on received data to provide relevant guidance for an assigned asset inspection, as well as generating capital plans using at least partially invalid or incomplete inspection data. The present disclosure goes beyond mere computerized paper and pencil implementation by auto-populating one or more inspection-related fields, incorporating at least GPS functionality that can acquire a device's precise location and provide only that data necessary for the particular inspection, by providing step-by-step input prompting based upon the device location, and by providing adaptive thresholding of asset-related criteria to determine whether and when asset maintenance should occur. This also provides the benefit of simplifying the inspection process for a user by providing them with only relevant information needed for a particular inspection, so the user can conduct their inspection more quickly, more clearly, and more concisely, without extraneous data gathering.

The present disclosure improves the performance and functionality of the system itself by acquiring inspection data for one or more railroad assets, providing step-wise inspection prompts for requesting only relevant inspection data, applying a data optimization algorithm to prevent the unnecessary storage of irrelevant data, analyzing railroad asset-related data (including historical data), and generating an optimized capital plan and schedule for railroad asset repair, maintenance, and replacement. In contrast, traditional systems simply rely on often-incomplete data, resulting in haphazard capital plans that are inundated with errors, slow to generate, and add to the strain on an already overspent system. The STAMP system not only determines when something needs to be replaced or maintenanced, but can also determine an optimal schedule.

The STAMP system can include a client running an inspection app, a WebUI, and a backend (server-side) system. By way of overview, the process flow can begin on the inspection app, which can be displayed on a client (e.g., mobile device) operable by a user inspecting a section of track or other railroad asset. Using a track inspection as an example, users can generate trackside inspections with or without connectivity. The precise location (e.g., latitude and longitude coordinates) of a user/client can be determined using a GPS radio disposed within a client device, or manual entry of the latitude and longitude coordinates. The STAMP system can transmit a map having the railroad line segment milepost to the client to build an inspection workflow. The location data can be captured at the trackside, along with the asset data for the track type (e.g., mainline, main one, main two, main three, turnout, switch, bridge, crossover, etc.), as well as defect data. In one exemplary embodiment, users can store inspections for one or more sections of track on a client without connectivity, and once connectivity is acquired, all the stored inspections can be uploaded from the inspection app and further processed by the backend system. The STAMP system can also provide adaptive content based on user input, historical data, or other relevant data.

The data acquired during a track inspection, can be viewed via the backend, which can include the WebUI (user interface system). The backend system can store and display all the inspections received from the inspection app. If there are any errors or mistakes in an inspection, the inspection can be reviewed and corrected in the WebUI.

The backend can dynamically capture inspections input into the inspection app by a user. All the plan and the material and the parts can be auto-generated with minimal user interaction by the backend via the WebUI. In either the inspection app or the WebUI, the user can verify that the default material and parts are correct, make any necessary changes to the material or parts, generate a capital plan, and then transmit the plan for approval. Once the capital plan is approved then it can be transmitted to a downstream estimation system and receive detailed estimates resulting in the generation of an authorization for expenditure as part of the capital plan. Advantageously, the present disclosure enhances the management process by implementing algorithms that generate and track analytics relevant to railroad assets and maintenance, capturing more detailed inspection records, and generating more data to analyze when replacing capital assets, to streamline capital management and capital plan generation. Accordingly, the present disclosure can provide the benefits of a reduction of asset inspection errors, optimization of maintenance scheduling, cost reductions due to maintenance planning using adaptive thresholds, and mitigation of unnecessary processing and network utilization.

It is an object of the invention to provide a system for generating a strategic track and maintenance planning inspection record for a railroad asset. It is a further object of the invention to provide a method for generating a strategic track and maintenance planning inspection record for a railroad asset. These and other objects are provided by at least the following embodiments.

In one embodiment, a system for generating a strategic track and maintenance planning inspection record for a railroad asset, can include: a memory having a first database with a plurality of inspection records, thresholds, and specifications related to an asset; a networked computer processor operably coupled to the memory and capable of executing machine-readable instructions to perform program steps, the program steps can comprise: receiving an asset type and an asset description; initiating, via the processor, an asset inspection based at least in part on the asset type or asset description; receiving a location of the client; retrieving, via a server operably coupled to an encrypted network, asset data having one or more inspection-related fields related to the location, the asset type, or the asset description; generating, via the processor, step-wise inspection prompts based upon the retrieved asset data; displaying a first step-wise inspection prompt on a client; determining whether any historical data for each inspection-related field is stored in the first database; if historical data for an inspection-related field exists, displaying an auto-populated response in the response field on the client; receiving a response to the inspection prompt or a verification of the auto-populated response; analyzing the response or verification to generate and display one or more customized inspection prompts; receiving a customized response to the customized inspection prompt; and generating, via the processor, a strategic track and maintenance planning inspection record for a railroad asset including the response and the customized response. Wherein the asset type is a rail, ballast, panel, tie, turnout, or facility. Wherein the customized inspection prompt is displayed only after the receipt of the response. Wherein the location of the client determines what type of inspection prompt to transmit to the client. Wherein the asset type of the client determines what type of inspection prompt to transmit to the client. Wherein the asset description of the client determines what type of inspection prompt to transmit to the client. Wherein the response or customized response is stored in one or more fields, parameters, characteristics, or metadata in the database. Wherein the memory can be operably coupled to the client or a server. Wherein the location of a client can be received via an input object or GPS device operably coupled to the client. Wherein the auto-populated response can be a historical value retrieved from the first database.

In another embodiment, a method of generating a strategic track and maintenance planning inspection record for a railroad asset, can include: receiving an asset type and an asset description; initiating, via a processor, an asset inspection based at least in part on the asset type or asset description; receiving a location of the client; retrieving, via a server operably coupled to an encrypted network, asset data having one or more inspection-related fields related to the location, the asset type, or the asset description; generating, via the processor, step-wise inspection prompts based upon the retrieved asset data; displaying a first step-wise inspection prompt on a client; determining whether any historical data for each inspection-related field is stored in the first database; if historical data for an inspection-related field exists, displaying an auto-populated response in the response field on the client; receiving a response to the inspection prompt or a verification of the auto-populated response; analyzing the response or verification to generate and display one or more customized inspection prompts; receiving a customized response to the customized inspection prompt; and generating, via the processor, a strategic track and maintenance planning inspection record for a railroad asset including the response and the customized response. Wherein the asset type is a rail, ballast, panel, tie, turnout, or facility. Wherein the customized inspection prompt is displayed only after the receipt of the response. Wherein the location of the client determines what type of inspection prompt to transmit to the client. Wherein the asset type of the client determines what type of inspection prompt to transmit to the client. Wherein the asset description of the client determines what type of inspection prompt to transmit to the client. Wherein the response or customized response is stored in one or more fields, parameters, characteristics, or metadata in the database. Wherein the memory can be operably coupled to the client or a server. Wherein the location of a client can be received via an input object or GPS device operably coupled to the client. Wherein the auto-populated response can be a historical value retrieved from the first database.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

FIGS. 11A-11E illustrate an exemplary embodiment of an inspection creation interface, in accordance with one or more exemplary embodiments of the present disclosure;

FIGS. 13A-13B illustrate an exemplary embodiment of a body annotation interface, in accordance with one or more exemplary embodiments of the present disclosure; and FIGS. 14A-14G illustrate an exemplary embodiment of an inspection termination interface, in accordance with one or more exemplary embodiments of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principal features described herein. The examples used in the following description are intended to facilitate an understanding of the ways in which the disclosure can be implemented and practiced. Accordingly, these examples should not be construed as limiting the scope of the claims.

Figure 1:
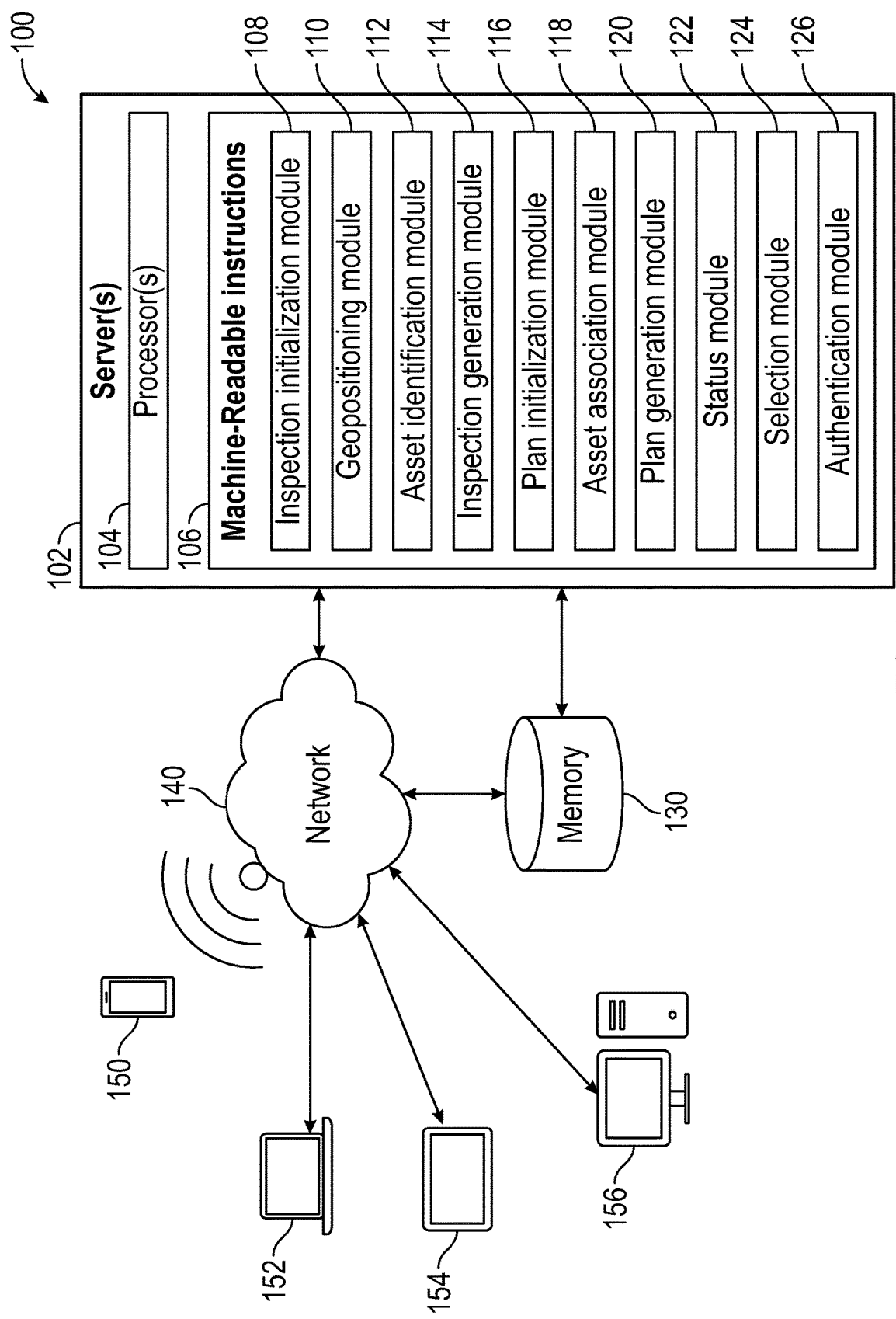
FIG. 1 illustrates a strategic track and maintenance planning system schematic, in accordance with one or more exemplary embodiments of the present disclosure.

FIG. 1 illustrates a schematic view of a Strategic Track And Maintenance Planning (STAMP) system 100, in accordance with one or more exemplary embodiments of the present disclosure. The STAMP system 100 can include one or more STAMP servers 102 having one or more processors 104, a memory 130, machine readable instructions 106, including an inspection initialization module 108, geopositioning module 110, asset identification module 112, inspection generation module 114, plan initialization module 116, asset association module 118, plan generation module 120, and status module 122, selection module 124, and authentication module 126, among other relevant modules. The server 102 can be operably coupled to one or more clients via a network 140. The clients can be a physical device (e.g., mobile phone 150, laptop 152, tablet 154, desktop computer 156, wearable device, or other suitable device), program, or application. In another exemplary embodiment, a client can include a mobile phone 150 having a mobile application configured to communicate with the server 102 over the network 140.

The aforementioned system components (e.g., server(s) 102 and client(s) 150, 152, 154, 156, etc.) can be communicably coupled to each other via the network 140, such that data can be transmitted. The network 140 can be the Internet, intranet, or other suitable network. The data transmission can be encrypted, unencrypted, over a VPN tunnel, or other suitable communication means. The network 140 can be a WAN, LAN, PAN, or other suitable network type. The network communication between the clients, server 102, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases can be operably coupled to the system components via the network 140.

The data transmitted to and from the components of system 100 (e.g., the server 102 and clients), can include any format, including JavaScript Object Notation (JSON), TCP/IP, XML, HTML, ASCII, SMS, CSV, representational state transfer (REST), or other suitable format. The data transmission can include a message, flag, header, header properties, metadata, and/or a body, or be encapsulated and packetized by any suitable format having same.

The server(s) 102 can be implemented in hardware, software, or a suitable combination of hardware and software therefor, and may comprise one or more software systems operating on one or more servers, having one or more processors 104, with access to memory 130. Server(s) 102 can include electronic storage, one or more processors, and/or other components. Server(s) 102 can include communication lines, connections, and/or ports to enable the exchange of information via a network 140 and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 130.

Memory 130 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 140.

Processor(s) 104 can be configured to provide data processing capabilities in server(s) 102. As such, processor(s) 104 can include one or more of a digital processor, an analog processor, a digital circuit designed to process information, an analog circuit designed to process information, a state machine, and/or other mechanisms for electronically processing information, such as FPGAs or ASICs. The processor(s) 104 can be a single entity or include a plurality of processing units. These processing units can be physically located within the same device, or processor(s) 104 can represent processing functionality of a plurality of devices or software functionality operating alone, or in concert.

The processor(s) 104 can be configured to execute machine-readable instructions 106 or machine learning modules via software, hardware, firmware, some combination of software, hardware, and/or firmware, and/or other mechanisms for configuring processing capabilities on processor(s) 104. As used herein, the term "machine-readable instructions" can refer to any component or set of components that perform the functionality attributed to the machine-readable instructions component 106. This can include one or more physical processors 104 during execution of processor-readable instructions, the processor-readable instructions, circuitry, hardware, storage media, or any other components.

The server(s) 102 can be configured with machine-readable instructions having one or more functional modules. The machine-readable instructions 106 can be implemented on one or more servers 102, having one or more processors 104, with access to memory 130. The machine-readable instructions 106 can be a single networked node, or a machine cluster, which can include a distributed architecture of a plurality of networked nodes. The machine-readable instructions 106 can include control logic for implementing various functionality, as described in more detail below. The machine-readable instructions 106 can include certain functionality associated with the STAMP system 100. Additionally, the machine-readable instructions 106 can include a smart contract or multi-signature contract that can process, read, and write data to the database, distributed ledger, or blockchain.

Figure 2:
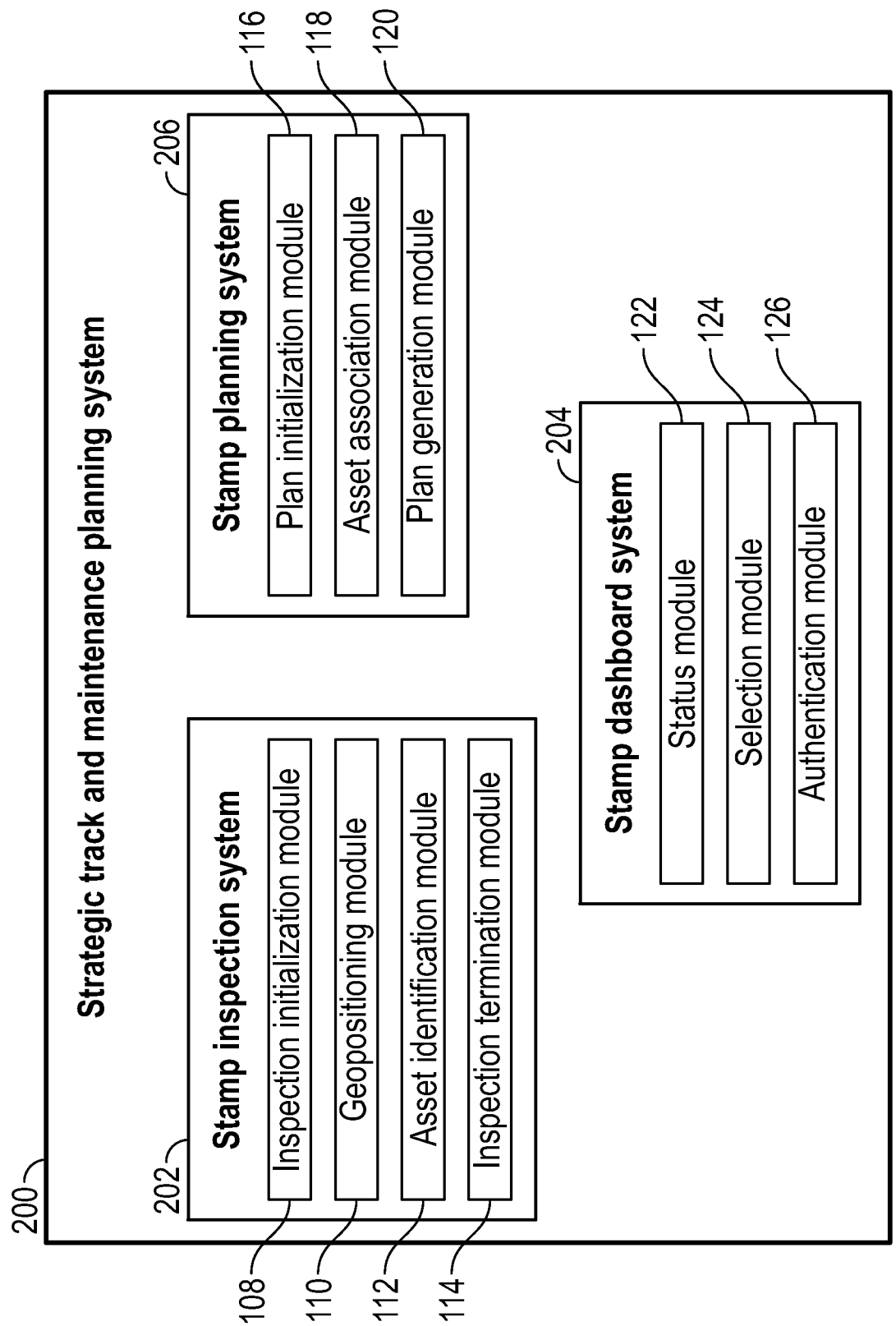
FIG. 2 illustrates a block diagram of a strategic track and maintenance planning system, in accordance with one or more exemplary embodiments of the present disclosure.

FIG. 2 illustrates a schematic view of a Strategic Track and Maintenance Planning system 200, in accordance with one or more exemplary embodiments of the present disclosure. STAMP system 200 can include a STAMP inspection system 202, a STAMP dashboard system, 204, and a STAMP planning system 206. Although certain exemplary embodiments may be directed to rail assets, the STAMP system 200 can be used to inspect and plan maintenance funding for any type of railroad asset, including rails, ballasts, panels, ties, turnouts, facilities, or any suitable asset.

In one exemplary embodiment, the STAMP dashboard system 204 can include status module 122, selection module 124, and authentication module 126. The status module 122, selection module 124, and authentication module 126 can implement one or more algorithms to facilitate inspection and maintenance planning of a railroad asset, including status, selection, and authentication algorithms. The algorithms and their associated thresholds and/or signatures can be programmable to suit a particular railroad asset, application, function, facility, or other requirement. The STAMP dashboard system 204 can be configured to send and receive messages related to an inspection, capital plan, or other suitable activity, to and from the client or server. In another exemplary embodiment, the STAMP dashboard system 204 can generate one or more elements for display on the user device. The elements can provide additional information to the user related to an inspection or capital plan. For example, alerts can be generated by the STAMP dashboard system 204 and displayed on the client to indicate count, completion, submission, request, or other suitable information. Additionally, system symbols can be displayed on the client to indicate task, inspection, or plan status.

The status module 122 can list data stored on the client or server for a particular user. In another exemplary embodiment, the status module 122 can indicate the status of one or entries stored on the client or server for a particular user. For example, an inspection stored on the client or server can be displayed on the client and labeled with its status (e.g., "in progress," "completed," or "to be completed") on a dashboard page of the client. In another exemplary embodiment, the status module 122 can display a notification on the client of a status change or a new requirement (e.g., new or re-inspection, capital plan generation, approval request, change request, etc.).

The selection module 124 can initiate an action. For example, the actions can include asset type selection, create inspection, download plans, search inspections, change settings, or other suitable action. In another exemplary embodiment, the selection module 124 can upload inspections to or download inspections from the server. In another exemplary embodiment, the selection module 124 can initiate an action by calling or instantiating one or more modules on the server, WebUI, or client. In another exemplary embodiment, one or more inspections may be transferred to or received from the client via the inspection initialization module 108 over an encrypted network 140.

The authentication module 126 can authenticate a user on a client, such as a mobile phone 150, laptop 152, tablet 154, wearable device, or other suitable device. In one exemplary embodiment, the authentication module 126 can authenticate a user or session using a username, password, authentication token, biometric, or other suitable attribute received from the client. In another exemplary embodiment, the authentication module 126 can generate an authentication token for a particular user, session, or request. In one exemplary embodiment, the authentication module 126 can generate an authentication token using user data stored in the client. For example, a user can access a client and/or the STAMP system by providing valid credentials via a login page or screen, including a username and password, biometrics, multi-factor authentication, or other suitable credential, such credentials, along with a user's information such as name, username, employee number, etc, can be stored in the client or server. In another exemplary embodiment, the authentication module 126 can process at least a portion of the credentials and/or user information to generate an authentication token. For example, the authentication token can be generated as a JSON Web Token (JWT), via dongles or key fobs that can periodically generate a new authentication token in accordance with a known algorithm, using an authenticator app on the client or sent on demand via SMS, by hashing at least a portion of the login credentials, or other suitable methodology. In another exemplary embodiment, the authentication token can allow for single sign-on authentication to the server and/or memory from the client.

In one exemplary embodiment, the STAMP inspection system 202 can include inspection initialization module 108, geopositioning module 110, asset identification module 112, and inspection generation module 114. The inspection initialization module 108, geopositioning module 110, asset identification module 112, and inspection generation module 114 can implement one or more algorithms to facilitate an inspection of a railroad asset and capture data related to the inspection, including an inspection creation, termination, and finalization algorithm. The algorithms and their associated thresholds and/or signatures can be programmable to suit a particular railroad asset, application, function, facility, or other requirement. The STAMP inspection system 202 can be configured to send and receive messages related to an inspection or other suitable activity, to and from the client or server. In another exemplary embodiment, the STAMP inspection system 202 can generate one or more elements for display on the user device. The elements can provide additional information to the user related to an inspection. For example, alerts can be generated by the STAMP inspection system 202 and displayed on the client to indicate inspection count, inspection completion, inspection submission, inspection request, or other suitable information. Additionally, system symbols can be displayed on the client to indicate inspection status.

In one exemplary embodiment, the inspection initialization module 108 can generate a user interface displayable on the client for inputting, receiving, and/or selecting one or more attributes related to a railroad asset inspection. In another exemplary embodiment, the client can receive information from the inspection initialization module 108 over an encrypted network. In another exemplary embodiment, the inspection initialization module 108 can generate data, images, or graphics for display on any client. The inspection initialization module 108 can serve web pages or data, via the server(s) 102, including via HTTP, HTTPS, FTP, VPN, JavaScript, API, HTML, AJAX, SOAP, RESTful services, or other suitable means. The inspection initialization module 108 can also provide a user interface for modifying the administrative portion of the STAMP inspection system 202, including algorithms and thresholds. The STAMP system 200 can utilize the inspection initialization module 108 to provide a user interface for generating user reports and viewing analytics related to any element of the STAMP system 102.

In one exemplary embodiment, the geopositioning module 110 can receive a location of the client from the client. In another exemplary embodiment, the client can include a GPS radio to receive GPS signals and determine the location of the client from the received GPS signals. In another exemplary embodiment, the client can triangulate its location using two or more received signals via a radio operably coupled or embedded within the mobile device. In another exemplary embodiment, the client can determine its location using a Wi-Fi positioning system that can uses the characteristics of nearby Wi-Fi hotspots and other wireless access points to discover where the client is located. The client location can be transmitted to the geopositioning module 110 via an encrypted network.

For example, during a rail inspection, a user can begin inspecting a rail segment by beginning at a start point on a first end of the rail segment and capture a series of data points related to the segment. In order to begin logging the data related to an inspection, the user's location must first be determined. In one exemplary embodiment, the user's location can be identified by receiving one or more characteristics of the user's location (e.g., line segment, milepost location, etc.) or by utilizing the GPS functionality of the client. In another exemplary embodiment, once the GPS location (latitude and longitude coordinates) are determined, the geopositioning module 110 can determine one or more characteristics of the user's location (e.g., line segment, milepost location, curve—high rail or low rail, etc.). In another exemplary embodiment, the GPS coordinates can determine the line segment and the mileposts by correlating the GPS coordinates with those stored in a geographic information system (GIS) database. For example, a GIS database can include one or more rail segment characteristics associated with a particular latitude and longitude coordinate.

In one exemplary embodiment, the asset identification module 112 can utilize a user's location, asset type, or asset description to determine what type of prompt to transmit to the client. For example, the prompt can include one or more criteria. In another exemplary embodiment, once the location is determined, the asset identification module 112 can automatically determine the asset parts for the inspection. In another exemplary embodiment, the criteria can be determined based on the part for a particular rail segment, room, floor, component, or other relevant element. For example, different rail sizes can be determined by the system based on the degree of the curve. The STAMP system 200 can retrieve parts and criteria stored in a database operably coupled to the server. Criteria can include, rail sizes, rail material, tie type, connection type, room dimensions, power rating, or temperature, among other relevant criteria.

In one exemplary embodiment, the inspection generation module 114 can generate, capture, and finalize an inspection. In one exemplary embodiment, the inspection can be based on one or more models related to the asset type. The model can include asset characteristics, criteria, standards, and/or requirements for that asset. For example, a rail model can include criteria such as track geometry, track number, main, non-main, siding branch, among others. In another exemplary embodiment, the model can be comprised of various parts for that model. For example, parts can include rails, transitions, fastener, anchor, curve block, and other relevant parts.

In another exemplary embodiment, the inspection generation module 114 can generate a series of data fields and/or questions on specific points (e.g., main track, curve, tangent, both, etc.) to customize the actual inspection of the rail segment at which the user is located based upon the model and its associated parts. Advantageously, the data fields and/or questions on specific points can be fed to the user after an entry/response to the data fields/questions is received from the user and analyzed by the inspection generation module 114. In another exemplary embodiment the inspection generation module 114 can retrieve a model stored in a database having relevant parts and criteria for that model. Once the relevant parts and criteria are received, the inspection generation module 114 can display the criteria as part of the adaptive inspection process for a particular rail segment. The parts and criteria can also be tied to location and timeframe, to provide even greater inspection customization.

The inspection generation module 114 can generate a next input request based upon a previous response. In another exemplary embodiment, inspection generation module 114 can use the criteria retrieved by the criteria for a particular part to generate the next inspection question. This provides the benefit of customizing input requests to ask only relevant questions, while streamlining the user interface. For example, for a rail inspection, the types of rail information to be captured by the inspection generation module 114 can include rail measurements, rail maker, installation year, and wear measurements (e.g., gauge, face, and vertical wear), among others. In another exemplary embodiment, the inspection generation module 114 can generate adaptive inspection fields based upon the particular rail segment being inspected or one or more rail characteristics. In another exemplary embodiment, there can be different rail criteria based on the characteristics of a particular rail segment to be inspected. For example, the degree of curve, tonnage amount run on the segment, among other relevant criteria, can cause different entry fields to be shown for a particular inspection. The inspection generation module 114 can display these fields on the client with user input elements, such as radio buttons, text fields, check boxes, and other suitable input elements. In another exemplary embodiment, the inspection generation module 114 can pre-populate one or more values for a rail segment into the user input elements based upon historical or other relevant stored data.

The inspection generation module 114 doesn't just list of the questions for a general part inspection that may or may not fit most parts. Instead, the questions can be customized to specific part being inspected. When an answer is input into the inspection generation module 114, whether the input was "yes" or "no," or "higher" or "lower," the inspection generation module 114 can generate the most relevant next question based upon the previous answer to generate an inspection flow. In another exemplary embodiment, fields can only allow certain types of data, to help prevent a user form entering data incorrectly. In another exemplary embodiment, the inspection generation module 114 inspection flow can direct the user to inspect the asset per a standard or policy and can capture all necessary data to analyze the inspection, while providing the precise location for the inspection with minimal user background knowledge. In another exemplary embodiment, once the inspection workflow terminates for an inspection, the inspection generation module 114 can save the inspection record to the client and/or database. In another exemplary embodiment, the inspection generation module 114 can prompt the user to upload the inspection and facilitate the inspection transfer to the STAMP WebUI or database.

In one exemplary embodiment, the STAMP planning system 206 can include plan initialization module 116, asset association module 118, and plan generation module 120. The plan initialization module 116, asset association module 118, and plan generation module 120 can implement one or more algorithms to facilitate a maintenance plan for a railroad asset and capture data related to the plan, including a maintenance plan creation, termination, and status algorithm. The algorithms and their associated thresholds and/or signatures can be programmable to suit a particular railroad asset, application, function, facility, or other requirement. The STAMP planning system 206 can be configured to send and receive messages related to a capital plan or other suitable activity, to and from the client or server. In another exemplary embodiment, the STAMP planning system 206 can generate one or more elements for display on the user device. The elements can provide additional information to the user related to a capital plan. For example, alerts can be generated by the STAMP inspection system 202 and displayed on the client to indicate plan count, plan completion, plan submission, plan request, or other suitable information. Additionally, system symbols can be displayed on the client to indicate plan status.

In one exemplary embodiment, the plan initialization module 116 can prompt a user to select whether a capital plan should be generated and/or generate an inspection record. In another exemplary embodiment, the plan initialization module 116 can process criteria as a user conducts an inspection. By way of example, if a rail only measures ¼" of wear and ⅝" of wear is necessary to generate a capital plan for the inspection, it is clear that the measured wear is not going to meet the capital plan requirements, so instead of creating a capital plan the inspection can be marked as complete and the inspection can be uploaded to the server without selecting plan creation. In one exemplary embodiment, if a plan is not created for an inspection, the inspection record is stored in the database. In another exemplary embodiment, if a plan is created, the inspection record can be stored in the database but the plan initialization module 116 can generate a specific plan number and populate that inspection record into a separate section where the inspections can be stored on the client or server. In another exemplary embodiment, when only the inspection is created, the associated inspection data can be stored in an inspection log. In another exemplary embodiment, certain information based on all the data entered can be retrieved by the plan initialization module 116 and populated into the capital plan. For example, all the logic can be processed in the background to generate a baseline for the related capital plan. The user can then review a capital plan, fill in any missing data, and review the data to ensure accuracy and verify that the plan is for the correct.

In another exemplary embodiment, the plan initialization module 116 can retrieve and associate stored thresholds associated with a railroad asset. In another exemplary embodiment, the plan initialization module 116 can utilize predictive modeling given one or more rail criteria to determine whether a capital plan should be created. For example, the tonnage on a track segment and the duration that this track has been in place can be considered by the plan initialization module 116 in determining whether or not to generate a capital plan. In one exemplary embodiment, the plan initialization module 116 can direct a user to inspect a particular rail segment and determine a scheduling program. In this way, the STAMP system can provide predictive modeling to determine what railroad assets need to be replaced, when.

In one exemplary embodiment, the asset association module 118 can adaptively correlate criteria to select the material for a particular part or model. For example, the asset association module 118 can automatically determine the rail size based upon the degree of the curve. The criteria for a particular model stored in a database can include one or more thresholds that can determine what material should be used, whether additional components should be included. This adaptive thresholding can alter one or more characteristics of the capital plan. Additionally, the thresholds are adaptive as the thresholding can change based upon the historical data, inspection data, season, temperature, cost, budget, or other relevant data. By way of example, if a high degree curve with more than a certain threshold of million gross tons (MGT) of traffic is identified by the asset association module 118, the module 118 can select a rail size of 41136 to suit that scenario, given the particular threshold value and associated material assignment in the database. One or more thresholds can be established for one or more materials, such that a first rail material can be selected for a curve between a first and second curve degree, and a second rail material is selected for a curve between a second and third curve degree. The material can also be modified based upon a second selection criteria, such as tonnage run over the track to date, or other indicator of rail wear. The asset association module 118 can set the rail size to 41136 to order and build the capital plan with 141-pound rail. In another exemplary embodiment, the asset association module 118 can provide adaptive thresholding of asset-related criteria based on changes in usage, wear, weather, or other relevant information. In another exemplary embodiment, the asset association module 118 can save the adapted thresholds in the database for a particular model.

The asset association module 118 can correlate actual measured data from the inspection with the calculated expected data generated by the STAMP system to determine whether one or more thresholds should be adapted. The adaptive thresholding can result in cost savings by reducing the use of more expensive materials required for certain applications, but no longer required for a particular line segment. The asset association module 118 can automatically reference MGT tables to understand the status of the rail segment based upon different scenarios for stored asset-related criteria, such as rail size, whether insulated joints are required, etc. In another exemplary embodiment, the data captured by the user during an inspection can be used as training data for a machine learning algorithm for the rail segment. The machine learning algorithm can analyze the captured data, along with any historical data, and determine whether or not a capital plan should be generated. In another exemplary embodiment, the system can generate a capital plan or override a plan generation determination by the user.

In one exemplary embodiment, the plan generation module 120 can generate a plan from a current or stored inspection record. In another exemplary embodiment, the plan generation module 120 can generate a unique plan ID, a plan version, a plan status, and place the plan into a draft. In another exemplary embodiment, the plan generation module 120 can import the budget year identified by the user and can associate a department code and project type based on the input information. In another exemplary embodiment, the plan generation module 120 can associate a project subtype (e.g., a rail relay on wood or concrete, at a higher rate or lower rate). In another exemplary embodiment, the plan generation module 120 can import specific information utilize that information to generate a funding code. In another exemplary embodiment, the user can select the funding code based on information that was provided. In another exemplary embodiment, the plan generation module 120 can import at least a portion of the location information. Such imported location information can include mile post location, track number, latitude and longitude coordinates.

In another exemplary embodiment, the plan generation module 120 can import a part and prompt the user to confirm a series of data points. In one exemplary embodiment, the plan generation can occur on the client or server (via a WebUI). For example, if the part is a curve high rail, the module can import the curve for that degree, the railway number can be identified, no plates are required can be verified, as well as the fastener type. In another exemplary embodiment, the part can be auto-populated. In another exemplary embodiment, the plan generation module 120 can auto-populate a part and prompt a user to confirm that the part is correct. In another exemplary embodiment, once the parts in the rail segment are confirmed, the plan generation module 120 can prompt the user to proceed and auto-populate the material based on the imported inspection record and any attributes input into the WebUI. In another exemplary embodiment, the plan generation module 120 can allow the user to customize the plan by adding or removing material based on plan requirements. In another exemplary embodiment, the plan generation module 120 can provide a text field to capture user notes. In another exemplary embodiment, the plan generation module 120 can save the part, any comments added, and then add the part to the capital plan. For example, for curves, one plan with one part can be generated. In other words, for a high curve one part in one plan can be generated. For a high curve, a separate part in a separate plan can be generated. If it is a canted rail it could have two parts one for each rail.

In this way, a capital plan can be generated using a plurality of different parts. In another exemplary embodiment, only those parts needing replacement based on the inspection can be included in the capital plan. In another exemplary embodiment, the plan generation module 120 can automatically calculate a cost based on the unit cost information that's imported for that material, based on the amount of material indicated and the unit cost. Advantageously, plan generation module 120 can estimate how much that project is going to cost. The part and material costs can be imported from a price database that maintains contract prices, operably coupled to the STAMP system. The STAMP system allows a user to perform an inspection and create a plan for any asset currently utilized. In another exemplary embodiments, the STAMP system 200 can approve plans in the client. In another exemplary embodiment, the models can include a scheduling parameter to indicate when and where an inspection should occur. Additionally, the STAMP system 200 can assign an inspection to a particular user, or group of users, and provided a notification in the client of a new inspection request.

Figure 3:
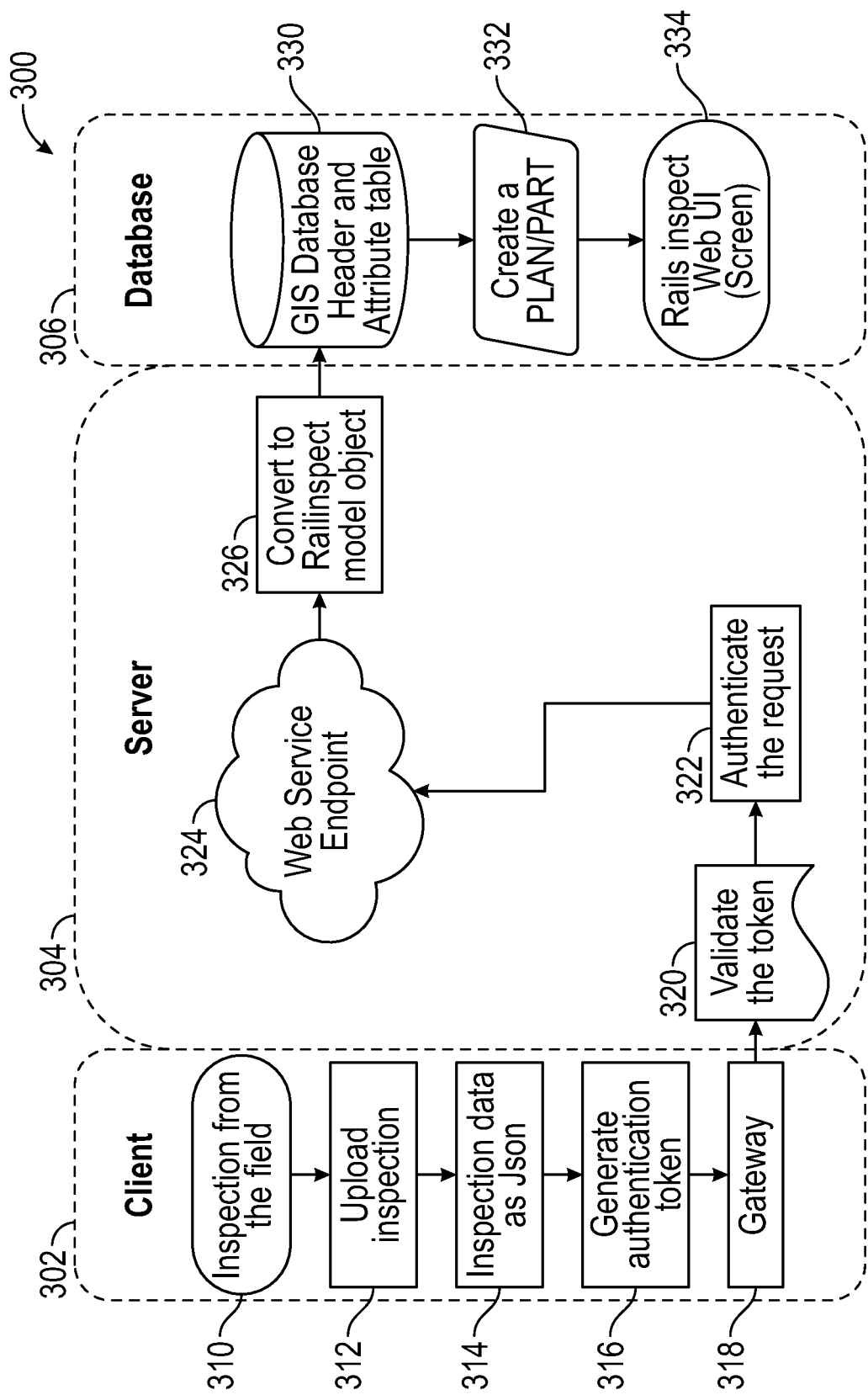
FIG. 3 illustrates a flowchart exemplifying strategic track and maintenance planning process flow control logic, in accordance with one or more exemplary embodiments of the present disclosure.

FIG. 3 illustrates a flowchart exemplifying strategic track and maintenance planning process flow control logic 300, in accordance with one or more exemplary embodiments of the present disclosure. The STAMP process flow control logic 300 can be implemented as an algorithm on a server 304, a machine learning module, a client 302, a database 306, or other suitable system. The STAMP process flow control logic 300 can be achieved with software, hardware, an application programming interface (API), a network connection, a network transfer protocol, HTML, DHTML, JavaScript, Dojo, Ruby, Rails, other suitable applications, or a suitable combination thereof.

The STAMP process flow control logic 300 can leverage the ability of a computer platform to spawn multiple processes and threads by processing data simultaneously. The speed and efficiency of the STAMP process flow control logic 300 can be greatly improved by instantiating more than one process to implement a STAMP inspection. However, one skilled in the art of programming will appreciate that use of a single processing thread may also be utilized and is within the scope of the present disclosure.

The STAMP process flow control logic 300 of the present embodiment begins at step 310, where the control logic 300 can generate or receive an inspection request. In one exemplary embodiment, the inspection request can be from a client in the field (e.g., proximate the railroad tracks). In another exemplary embodiment, the inspection request can include inspection data having one or more fields, parameters, characteristics, or metadata, related to an inspection. In another exemplary embodiment, the request can include a command such as upload, download, save, retrieve, or other suitable command. The control logic 300 then proceeds to step 312.

At step 312, the control logic 300 can generate a request using inspection data. upload an inspection. In one exemplary embodiment, the inspection can be a data file including one or more characteristics of the railroad asset. The control logic 300 then proceeds to step 314.

At step 314, the control logic 300 can format the inspection data into a data file or message. In one exemplary embodiment, the data file, message, string, or pipe can be a JSON message, SOAP message, XML file, RESTful string, or other suitable format. The control logic 300 then proceeds to step 316.

At step 316, the control logic 300 can generate an authentication token for a particular request. In one exemplary embodiment, the control logic 300 can receive an authentication token from a client over an encrypted network. For example, a client 302 can access the STAMP system by providing valid credentials via a login, including a username and password, biometrics, multi-factor authentication, or other suitable credential. In another exemplary embodiment, the credentials can be processed to generate an authentication token. For example, the authentication token can be generated as a JSON Web Token (JWT), via dongles or key fobs that periodically generate a new authentication token in accordance with a known algorithm, using an authenticator app on the client or sent on demand via SMS, by hashing at least a portion of the login credentials, or other suitable methodology. In another exemplary embodiment, the authentication token can allow for single sign-on authentication to the server 304 and/or database 306 from the client 302. The control logic 300 then proceeds to step 318.

At step 318, the authentication token is transmitted to a gateway. In one exemplary embodiment, the gateway can be a router, switch, or other suitable device. In another exemplary embodiment, the gateway can be operatively coupled to an encrypted network. The control logic 300 then proceeds to step 320.

At step 320, the control logic 300 can validate the token. In one exemplary embodiment, the authentication token can be parsed by the server 304 to validate access for the client 302. In another exemplary embodiment, an authentication may be successful if a user can prove to a server that he or she is a valid user by passing a security token. The control logic 300 then proceeds to step 322.

At step 322, the control logic can authenticate a request. In one exemplary embodiment, after the authentication token is validated by the server 304, it can be used to establish security context for the client 302, so the server 304 can make authorization decisions or audit activity for successive user requests. In another exemplary embodiment, the server 304 would attempt to verify the token and, if successful, would continue processing the request. If the server could not verify the token, the server 302 can generate a message stating that the request could not be processed as authorization could not be verified. In another example embodiment, the request may be to upload, download, review, or finalize inspection data or files, among other relevant requests. The control logic 300 then proceeds to step 324.

At step 324, the control logic 300 can generate a web service endpoint. in one exemplary embodiment, a web service endpoint can be an entity, processor, or resource on the server 304 that can be referenced and to which web services messages can be addressed. Endpoint references can convey the information needed to address a web service endpoint. In another exemplary embodiment, a web service endpoint can be a web address (e.g., URL) at which the client 302 can gain access to the server 304 resources. In another exemplary embodiment, by referencing the URL, the client 302 can access operations provided by that server 304. The control logic 300 then proceeds to step 326.

At step 326, the control logic 300 can convert the request to a rail inspect model object. In one exemplary embodiment, a model can be related to a particular type of inspection. For example, the model may have a rail, ballast, panel, tie, turnout, or other suitable model type. In another exemplary embodiment, a model can have one or more objects related thereto. Each object can have one or more characteristics or parameters related to the particular model. In another exemplary embodiment come out the request can be parsed deselect one or more fields of the request for conversion into a model object. The control logic 300 then proceeds to step 330.

At step 330, the control logic 300 can add a model to the GIS database. In one exemplary embodiment, the model can include a header. In another exemplary embodiment, the model can include an attribute table. The model can be customized to suit any relevant data related to the model type, including rail, ballast, panel, tie, turnout, or other suitable model types. The control logic 300 then proceeds to step 332.

At step 332, the control logic 300 can generate a capital plan. The capital plan can include rail inspection data, and rail criteria, as discussed in more detail below. The control logic 300 then proceeds to step 334

A step 334, the control logic 300 can render an inspection screen via the web UI. The control logic 300 then terminates or awaits a new request and can repeat the aforementioned steps.

Figure 4:
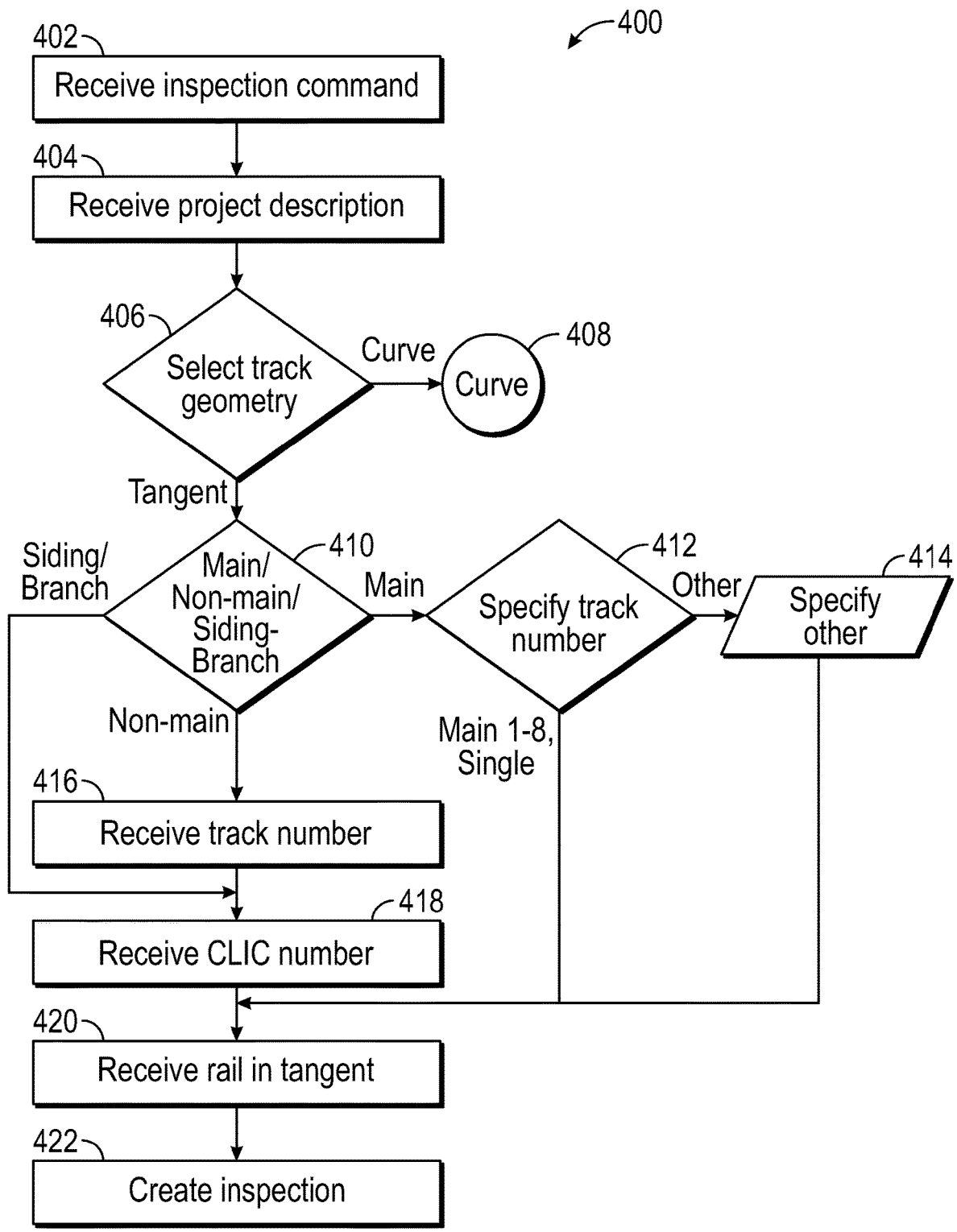
FIG. 4 illustrates a flowchart exemplifying tangent-flow rail inspection creation control logic, in accordance with one or more exemplary embodiments of the present disclosure.

FIG. 4 illustrates a flowchart exemplifying tangent-flow rail inspection control logic 400, in accordance with one or more exemplary embodiments of the present disclosure. The tangent-flow rail inspection control logic 400 can be implemented as an algorithm on a server 304, a machine learning module, a client 302, a database 306, or other suitable system. Additionally, the tangent-flow rail inspection control logic 400 can implement or incorporate one or more features of the STAMP inspection system 202, including inspection initialization module 108, geopositioning module 110, asset identification module 112, and inspection generation module 114. The tangent-flow rail inspection control logic 400 can be achieved with software, hardware, an application programming interface (API), a network connection, a network transfer protocol, HTML, DHTML, JavaScript, Dojo, Ruby, Rails, other suitable applications, or a suitable combination thereof. One or more exemplary embodiments of the tangent-flow rail inspection control logic 400 may be shown in FIGS. 11A-11C.

The tangent-flow rail inspection control logic 400 can leverage the ability of a computer platform to spawn multiple processes and threads by processing data simultaneously. The speed and efficiency of the tangent-flow rail inspection control logic 400 can be greatly improved by instantiating more than one process to implement a tangent-flow rail inspection. However, one skilled in the art of programming will appreciate that use of a single processing thread may also be utilized and is within the scope of the present disclosure.

The tangent-flow rail inspection control logic 400 of the present embodiment begins at step 402, where the control logic 400 can receive an inspection creation command. In one exemplary embodiment, the inspection command can be generated the selection of a create inspection command. For example, the create inspection command can be an image or symbol that is selectable on the screen of a client. In another exemplary embodiment, the control logic 400 can receive an asset type and an asset description. In another exemplary embodiment, the control logic 400 can initiate an asset inspection based at least in part on the asset type or asset description. In another exemplary embodiment the control logic 400 can retrieve via an encrypted network, asset data having one or more inspection-related fields related to the location, the asset type, or the asset description from a database. In another exemplary embodiment, commands or data can be received via user input generated on a client or server, such as a screen tap, swipe, mouse click, key press, voice command, or other suitable mechanism. In another exemplary embodiment, the inspection commands or data can include inspection data having one or more fields, parameters, characteristics, or metadata, related to an inspection. In another exemplary embodiment, the command can initiate an upload, download, save, retrieve, or other suitable action. The control logic 400 then proceeds to step 404.

At step 404, the control logic 400 can receive a project description. In one exemplary embodiment, the project description can be received via user input from the client. For example, the project description can be a text string received from the client. The text string can be received from user input. The control logic 400 then proceeds to step 406.

At step 406, the control logic 400 can determine the track geometry. In one exemplary embodiment, the control logic 400 can display one or more options for a track geometry on the client. For example, the track geometry can be a curved track, tangent track, or other suitable track geometry. In another exemplary embodiment, the track geometry can be determined via user input from the client. If the track geometry is tangent, the control logic 400 proceeds to step 410. If the track geometry is curve(d), the control logic 400 proceeds to step 408.

Figure 5:
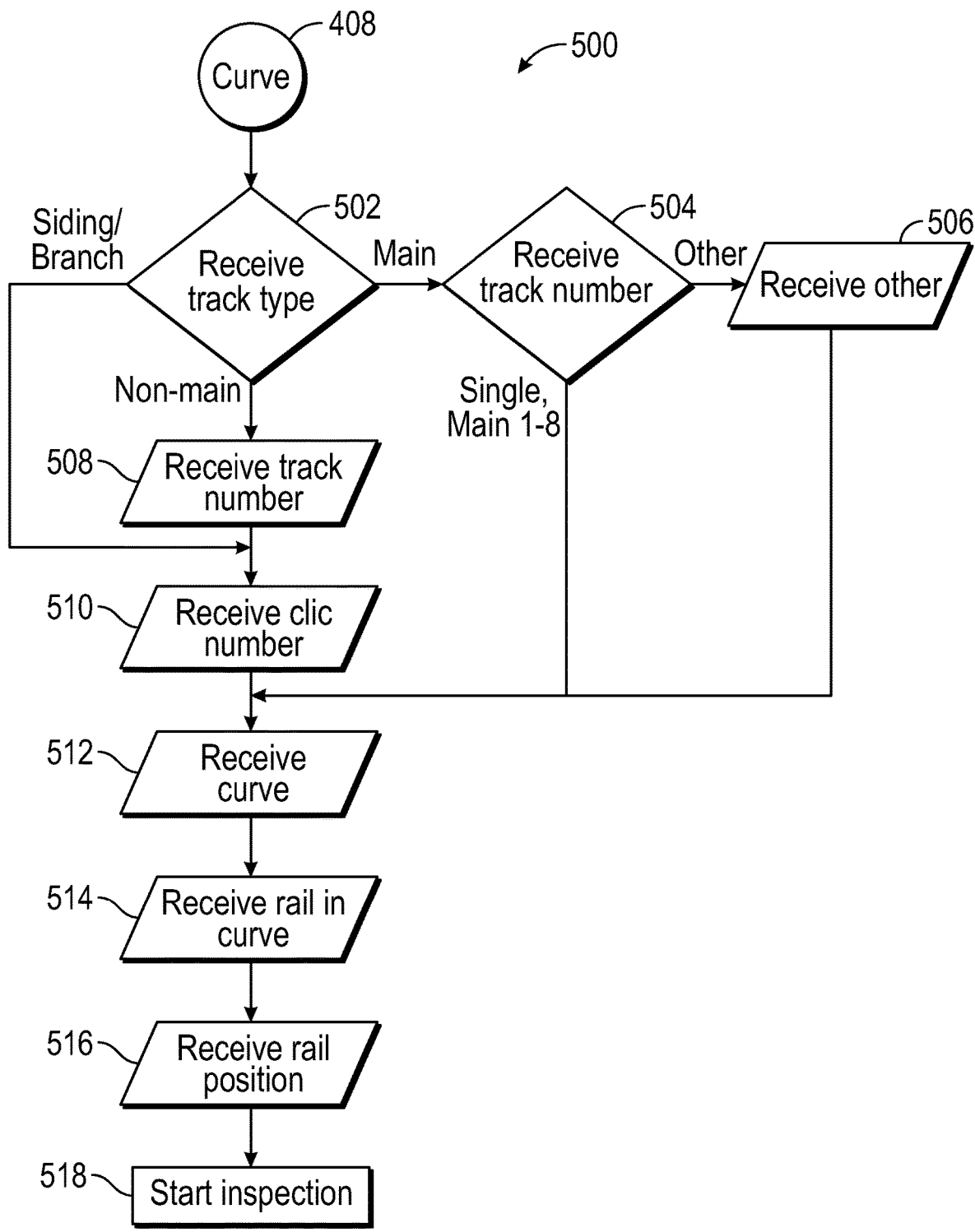
FIG. 5 illustrates a flowchart exemplifying curve-flow rail inspection creation control logic, in accordance with one or more exemplary embodiments of the present disclosure.

At step 408, the control logic 400 can initiate a curved rail inspection algorithm, as described in more detail in FIG. 5.

At step 410, the control logic 400 can determine the track type. In one exemplary embodiment, the control logic 400 can display one or more options for a tracked type on the client. For example, the track type can be main, non-main, siding or branch, or other suitable track type. In another exemplary embodiment, the track type can be determined via user input from the client. If the track type is main, the control logic 400 proceeds to step 412. If the track type is non-main, the control logic 400 proceeds to step 416. If the track type is siding or branch, the control logic 400 proceeds to step 418.

At step 412, the control logic 400 can receive the track number. In one exemplary embodiment, the control logic 400 can display one or more options for a track number on the client. For example, the track number can be Single, Main 1, Main 2, Main N, or other suitable track number. In another exemplary embodiment, the track number can be for a backtrack, industry, or yard. In another exemplary embodiment, the track number can be received via user input from the client. If the track number is Single or Main 1-Main 8, the control logic 400 proceeds to step 420. If the track number is a different (other) number, the control logic 400 proceeds to step 414.

At step 414, the control logic 400 can receive the other track number. In one exemplary embodiment, the control logic 400 can display an input object (e.g., text field) and keyboard on the client to receive user input specifying the other track number. The control logic 400 then proceeds to step 420.

At step 416, the control logic 400 can receive the track number. In one exemplary embodiment, the control logic 400 can display one or more options for a track number on the client. For example, the track number can be Single, Main 1, Main 2, Main N, or other suitable track number. In another exemplary embodiment, the track number can be received via user input from the client. The control logic 400 then proceeds to step 418.

At step 418, the control logic 400 can receive the Car Location Inventory Control (CLIC) number. In one exemplary embodiment, the CLIC number can include six digits. For example, the first two digits designate the zone, the second two digits indicate the track number within the zone, and the last two digits represent the location on the track. In another exemplary embodiment, the CLIC number can be received via user input from the client. The control logic 400 then proceeds to step 420.

At step 420, the control logic 400 can receive the rail position for a rail in tangent. In one exemplary embodiment, the tangent rail position can be left, right, both, or other suitable position. The control logic 400 then proceeds to step 420.

At step 422, the control logic 400 can create a new inspection. In one exemplary embodiment, the control logic 400 can prompt a user to begin inspection once the project description, track geometry, and track type are determined. In another exemplary embodiment, the control logic 400 can create a new inspection record. The inspection record can be stored on the client or the server. The control logic 400 can prompt the user by displaying a button, graphic, or other suitable widget on the client. In another exemplary embodiment, the control logic 400 can save or update inspection details to a client or server database. In another exemplary embodiment, the control logic 400 can launch an inspection begin screen or other suitable display screen on the client. The control logic 400 then terminates or awaits a new inspection creation request and can repeat the aforementioned steps.

FIG. 5 illustrates a flowchart exemplifying curve-flow rail inspection control logic 500, in accordance with one or more exemplary embodiments of the present disclosure. The curve-flow rail inspection control logic 500 can be implemented as an algorithm on a server 304, a machine learning module, a client 302, a database 306, or other suitable system. Additionally, the curve-flow rail inspection control logic 500 can implement or incorporate one or more features of the STAMP inspection system 202, including inspection initialization module 108, geopositioning module 110, asset identification module 112, and inspection generation module 114. The curve-flow rail inspection control logic 500 can be achieved with software, hardware, an application programming interface (API), a network connection, a network transfer protocol, HTML, DHTML, JavaScript, Dojo, Ruby, Rails, other suitable applications, or a suitable combinations thereof. One or more exemplary embodiments of the curve-flow rail inspection control logic 500 may be shown in FIGS. 11D-11E.

The curve-flow rail inspection control logic 500 can leverage the ability of a computer platform to spawn multiple processes and threads by processing data simultaneously. The speed and efficiency of the curve-flow rail inspection control logic 500 can be greatly improved by instantiating more than one process to implement a curve-flow rail inspection. However, one skilled in the art of programming will appreciate that use of a single processing thread may also be utilized and is within the scope of the present disclosure.

The curve-flow rail inspection control logic 500 of the present embodiment begins at step 408, where the control logic 500 can receive a curved track inspection instantiation according to step 408 of FIG. 4. In one exemplary embodiment, commands or data can be received via user input generated on a client or server, such as a screen tap, swipe, mouse click, key press, voice command, or other suitable mechanism. In another exemplary embodiment, the inspection commands or data can include inspection data having one or more fields, parameters, characteristics, or metadata, related to an inspection. The control logic 500 then proceeds to step 502.

At step 502, the control logic 500 can receive the track type. In one exemplary embodiment, the control logic 500 can display one or more options for a tracked type on the client. For example, the track type can be main, non-main, siding or branch, or other suitable track type. In another exemplary embodiment, the track type can be determined via user input from the client. If the track type is main, the control logic 500 proceeds to step 504. If the track type is non-main, the control logic 500 proceeds to step 508. If the track type is siding or branch, the control logic 500 proceeds to step 510.

At step 504, the control logic 500 can receive the track number. In one exemplary embodiment, the control logic 500 can display one or more options for a track number on the client. For example, the track number can be Single, Main 1, Main 2, Main N, or other suitable track number. In another exemplary embodiment, the track number can be received via user input from the client. If the track number is Single or Main 1-Main 8, the control logic 500 proceeds to step 512. If the track number is a different (other) number, the control logic 500 proceeds to step 506.

At step 506, the control logic 500 can receive the other track number. In one exemplary embodiment, the control logic 500 can display a text field and keyboard on the client to receive user input specifying the other track number. The control logic 500 then proceeds to step 512.

At step 508, the control logic 500 can receive the track number. In one exemplary embodiment, the control logic 500 can display one or more options for a track number on the client. For example, the track number can be Single, Main 1, Main 2, Main N, or other suitable track number. In another exemplary embodiment, the track number can be received via user input from the client. The control logic 500 then proceeds to step 510.

At step 510, the control logic 500 can receive the Car Location Inventory Control (CLIC) number. In one exemplary embodiment, the CLIC number can include six digits. For example, the first two digits designate the zone, the second two digits indicate the track number within the zone, and the last two digits represent the location on the track. In another exemplary embodiment, the CLIC number can be received via user input from the client. The control logic 500 then proceeds to step 512.

At step 512, the control logic 500 can receive a curve number. In one exemplary embodiment, the control logic 500 can display a text field and keyboard on the client to receive user input specifying the curve number. The control logic 500 then proceeds to step 514.

At step 514, the control logic 500 can receive the rail in the curve. In one exemplary embodiment, the control logic 400 can display one or more options for a rail in the curve on the client. For example, the rain in the curve can be high, low, or other suitable rail. In another exemplary embodiment, the rail in the curve can be received via user input from the client. The control logic 500 then proceeds to step 516.

At step 516, the control logic 500 can receive the rail position for a rail in tangent. In one exemplary embodiment, the tangent rail position can be left, right, both, or other suitable position. The control logic 500 then proceeds to step 518.

At step 518, the control logic 500 can create a new inspection. In one exemplary embodiment, the control logic 500 can prompt a user to begin inspection. In another exemplary embodiment, the control logic 500 can create a new inspection record. The inspection record can be stored on the client or the server. The control logic 500 can prompt the user by displaying a button, graphic, or other suitable widget on the client. In another exemplary embodiment, the control logic 500 can save or update inspection details to a client or server database. In another exemplary embodiment, the control logic 500 can launch an inspection begin screen or other suitable display screen on the client. The control logic 500 then terminates or awaits a new inspection creation request and can repeat the aforementioned steps.

Figure 6:
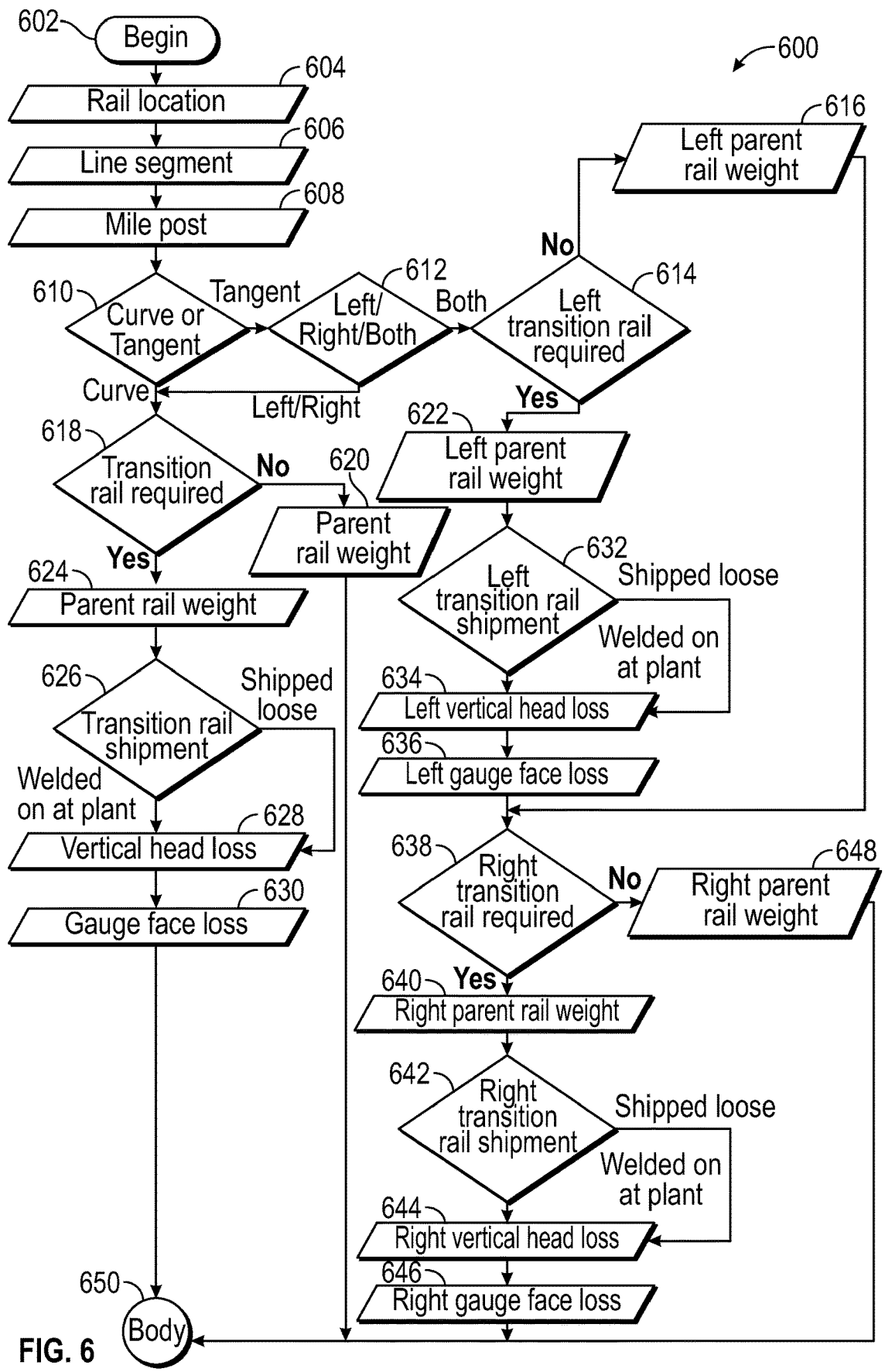
FIG. 6 illustrates a flowchart exemplifying rail inspection control logic, in accordance with one or more exemplary embodiments of the present disclosure.

FIG. 6 illustrates a flowchart exemplifying rail inspection control logic 600, in accordance with one or more exemplary embodiments of the present disclosure. The rail inspection control logic 600 can be implemented as an algorithm on a server 304, a machine learning module, a client 302, a database 306, or other suitable system. Additionally, the rail inspection control logic 600 can implement or incorporate one or more features of the STAMP inspection system 202, including inspection initialization module 108, geopositioning module 110, asset identification module 112, and inspection generation module 114. The rail inspection control logic 600 can be achieved with software, hardware, an application programming interface (API), a network connection, a network transfer protocol, HTML, DHTML, JavaScript, Dojo, Ruby, Rails, other suitable applications, or a suitable combination thereof. One or more exemplary embodiments of the rail inspection control logic 600 may be shown in FIGS. 12A-12B.

The rail inspection control logic 600 can leverage the ability of a computer platform to spawn multiple processes and threads by processing data simultaneously. The speed and efficiency of the rail inspection control logic 600 can be greatly improved by instantiating more than one process to implement a tangent-flow rail inspection. However, one skilled in the art of programming will appreciate that use of a single processing thread may also be utilized and is within the scope of the present disclosure.

The rail inspection control logic 600 of the present embodiment begins at step 602, where the control logic 600 can display one or more prompts related to the inspection. In one exemplary embodiment, the prompts can be retrieved for a particular asset at a particular location from inspection-related data stored in a database. In another exemplary embodiment, the prompts can be presented in a step-wise manner, such that subsequent prompts may not be displayed until a first prompt is responded to. In another exemplary embodiment, the prompts can be presented in a step-wise manner, such that subsequent prompts may not be displayed until a first group of prompts is responded to. In another exemplary embodiment, step-wise inspection prompts can be generated by control logic 600 based upon retrieved asset data. In another exemplary embodiment, the control logic 600 can display a first step-wise inspection prompt on the client. In another exemplary embodiment, the control logic 600 can identify whether any historical data for each inspection-related field is stored in a first database. For example, the control logic 600 can compare the-inspection-related fields associated with the inspection prompts with the inspection-related fields stored in the database for a particular location. If a value is stored in the database for an inspection related field, that value can be auto-populated in the input object associated with the inspection prompt. Historical data can include values such as measurements, standards, thresholds, ranges, costs, or other suitable data. In another exemplary embodiment, if historical data for an inspection-related field exists, the control logic 600 can display an auto-populated response in the response field on the client. For example, the auto-populated response can be a historical value retrieved from the database, or a value determined by the STAMP system. In another exemplary embodiment, the prompts can include corresponding input objects, such as text boxes, radio buttons, check boxes, or other suitable input objects. In another exemplary embodiment, the input objects can be configured to receive user input, such as a screen tap, swipe, mouse click, key press, voice command, or other suitable mechanism. In another exemplary embodiment, the input objects can include one or more fields, parameters, characteristics, or metadata, related to an inspection. The control logic 600 then proceeds to step 604.

At step 604, the control logic 600 can receive the beginning rail location of the client. In one exemplary embodiment, the control logic 600 can receive a response to one or more inspection prompts or a verification of the auto-populated response, if any. In another exemplary embodiment, the control logic 600 can display an input object to receive a response to the input prompts (e.g., beginning rail location). For example, input objects such as text boxes, radio buttons, check boxes, or other suitable input object can be displayed by the control logic 600 on the client or server. In another exemplary embodiment, the input object can be configured to receive user input, such as a screen tap, swipe, mouse click, key press, voice command, or other suitable mechanism. In another exemplary embodiment, the control logic 600 can store the beginning rail location into one or more fields, parameters, characteristics, or metadata in memory on the client or server. In another exemplary embodiment, the control logic 600 can instantiate the GPS functionality of the client to determine the client's location. For example, the control logic 600 can receive the latitude and longitude coordinates of the client from the geopositioning module or GPS device coupled to the client. The control logic 600 then proceeds to step 606.

At step 606, the control logic 600 can receive a line segment value. In another exemplary embodiment, the control logic 600 can display a text field and keyboard on the client to receive user input specifying the line segment proximate the client. In another exemplary embodiment, the control logic 600 can overwrite the received GPS latitude and longitude coordinates when the line segment is indicated. The control logic 600 then proceeds to step 608.

At step 608, the control logic 600 can receive a mile post value. In one exemplary embodiment, the control logic 600 can display a text field and keyboard on the client to receive user input specifying the mile post proximate the client. In another exemplary embodiment, the control logic 600 can overwrite the received GPS latitude and longitude coordinates when the mile post is indicated. The control logic 600 then proceeds to step 610.

At step 610, the control logic 600 can determine the track geometry. In one exemplary embodiment, the control logic 400 can display one or more options for a track geometry on the client. For example, the track geometry can be a curved track, tangent track, or other suitable track geometry. In another exemplary embodiment, the track geometry can be determined via user input from the client. If the track geometry is tangent, the control logic 600 proceeds to step 612. If the track geometry is curve(d), the control logic 600 proceeds to step 618.

At step 612, the control logic 600 can determine the rail position to be inspected for a rail in tangent. In one exemplary embodiment, the tangent rail position can be left, right, both, or other suitable position. If the rail position is left or right, the control logic 600 proceeds to step 618. If the rail position is both, the control logic 600 proceeds to step 614.

At step 618, the control logic 600 can receive an indication of whether a transition rail is required. In one exemplary embodiment, the control logic 600 can display an input object to receive the transition rail indication. For example, input objects such as text boxes, radio buttons, check boxes, or other suitable input objects can be displayed by the control logic 600 on the client or server. In another exemplary embodiment, the input object can be configured to receive user input, such as a screen tap, swipe, mouse click, key press, voice command, or other suitable mechanism. In another exemplary embodiment, the control logic 600 can store the transition rail indication into one or more fields, parameters, characteristics, or metadata in memory on the client or server. A transition rail is a track component that can connect two different rail sections. If a transition rail is required, the control logic 600 proceeds to step 624. If a left transition rail is not required, the control logic 600 proceeds to step 620.

At step 620, the control logic 600 can receive a parent rail weight. In one exemplary embodiment, the control logic 600 can display an input object to receive the parent rail weight. For example, input objects such as text boxes, radio buttons, check boxes, or other suitable input objects can be displayed by the control logic 600 on the client or server. In another exemplary embodiment, the input object can be configured to receive user input, such as a screen tap, swipe, mouse click, key press, voice command, or other suitable mechanism. In another exemplary embodiment, the control logic 600 can store the parent rail weight into one or more fields, parameters, characteristics, or metadata in memory on the client or server. For example rail weights can range between 100 lbs. and 150 lbs. The control logic 600 then proceeds to step 650.

At step 624, the control logic 600 can receive a parent rail weight. In one exemplary embodiment, the control logic 600 can display an input object to receive the parent rail weight. For example, input objects such as text boxes, radio buttons, check boxes, or other suitable input objects can be displayed by the control logic 600 on the client or server. In another exemplary embodiment, the input object can be configured to receive user input, such as a screen tap, swipe, mouse click, key press, voice command, or other suitable mechanism. In another exemplary embodiment, the control logic 600 can store the parent rail weight into one or more fields, parameters, characteristics, or metadata in memory on the client or server. For example, rail weights can range between 100 lbs. and 150 lbs. The control logic 600 then proceeds to step 626.

At step 626, the control logic 600 receives an indication whether the ending transition rail is shipped loose or welded on at the plant. In one exemplary embodiment, the control logic 600 can display an input object to receive the ending transition rail shipment indication. For example, input objects such as text boxes, radio buttons, check boxes, or other suitable input objects can be displayed by the control logic 600 on the client or server. In another exemplary embodiment, the input object can be configured to receive user input, such as a screen tap, swipe, mouse click, key press, voice command, or other suitable mechanism. In another exemplary embodiment, the control logic 600 can store the ending transition rail shipment indication into one or more fields, parameters, characteristics, or metadata in memory on the client or server. If the ending transition rail shipment is shipped loose, the control logic 600 proceeds to step 628. If the ending transition rail shipment is welded on at the plant, the control logic 600 proceeds to step 628.

At step 628, the control logic 600 can receive a vertical head loss value. For example, vertical head loss is the shortening of a rail head due to locomotive travel over the rail. In one exemplary embodiment, the control logic 600 can display a text field and keyboard on the client to receive user input specifying the vertical head loss value. The control logic then proceeds to step 630.

At step 630, the control logic 600 can receive a gauge face loss value. For example, gauge face loss is the erosion of the face of a rail head facing the gage side of railroad tracks. As wheels roll through a curve, the wheels on both the high and low rails can produce a lateral, gauge spreading force. Particularly, wear on the gage face of the rail can be caused by contact loads applied to the side of the rail head by wheel flanges. In one exemplary embodiment, the control logic 600 can display a text field and keyboard on the client to receive user input specifying the gauge face loss value. The control logic 600 then proceeds to step 650.

At step 614, the control logic 600 determines whether a left transition rail is required. A transition rail is a track component that can connect two different rail sections. If a left transition rail is required, the control logic proceeds to step 622. If a left transition rail is not required, the control logic 600 proceeds to step 616.

At step 616, the control logic 600 can receive a parent rail weight. In one exemplary embodiment, the control logic 600 can display a text field and keyboard on the client to receive user input specifying the rail weight for the left rail. For example, rail weights can range between 100 lbs. and 150 lbs. The control logic 600 then proceeds to step 638.

At step 622, the control logic 600 can receive a left parent rail weight. In one exemplary embodiment, the control logic 600 can display a text field and keyboard on the client to receive user input specifying the rail weight for the left rail. For example, rail weights can range between 100 lbs. and 150 lbs. The control logic 600 then proceeds to step 632.

At step 632, the control logic 600 determines whether the left transition rail is shipped loose or welded on at the plant. If the rail shipment for the left transition rail is shipped loose, the control logic proceeds to step 634. If the rail shipment for the left transition rail is shipped welded on at the plant, the control logic proceeds to step 634.

At step 634, the control logic 600 can receive a left vertical head loss value. For example, vertical head loss is the shortening of a rail head due to locomotive travel over the rail. In one exemplary embodiment, the control logic 600 can display a text field and keyboard on the client to receive user input specifying the left vertical head loss value. The control logic then proceeds to step 636.

At step 636, the control logic 600 can receive a left gauge face loss value. For example, gauge face loss is the erosion of the face of a rail head facing the gage side of railroad tracks. As wheels roll through a curve, the wheels on both the high and low rails can produce a lateral, gauge spreading force. Particularly, wear on the gage face of the rail can be caused by contact loads applied to the side of the rail head by wheel flanges. In one exemplary embodiment, the control logic 600 can display a text field and keyboard on the client to receive user input specifying the left gauge face loss value. The control logic 600 then proceeds to step 638.

At step 638, the control logic 600 determines whether a right transition rail is required. A transition rail is a track component that can connect two different rail sections. If a right transition rail is required, the control logic proceeds to step 640. If a right transition rail is not required, the control logic 600 proceeds to step 648.

At step 640, the control logic 600 can receive a right parent rail weight. In one exemplary embodiment, the control logic 600 can display a text field and keyboard on the client to receive user input specifying the rail weight for the right rail. For example, rail weights can range between 100 lbs. and 150 lbs. The control logic 600 then proceeds to step 642.

At step 648, the control logic 600 can receive a left parent rail weight. In one exemplary embodiment, the control logic 600 can display a text field and keyboard on the client to receive user input specifying the rail weight for the left rail. For example, rail weights can range between 100 lbs. and 150 lbs. The control logic 600 then proceeds to step 650.

At step 642, the control logic 600 determines whether the right transition rail is shipped loose or welded on at the plant. If the rail shipment for the right transition rail is shipped loose, the control logic proceeds to step 644. If the rail shipment for the right transition rail is shipped welded on at the plant, the control logic proceeds to step 644.

At step 644, the control logic 600 can receive a left vertical head loss value. For example, vertical head loss is the shortening of a rail head due to locomotive travel over the rail. In one exemplary embodiment, the control logic 600 can display a text field and keyboard on the client to receive user input specifying the left vertical head loss value. The control logic then proceeds to step 646.

At step 646, the control logic 600 can receive a left gauge face loss value. For example, gauge face loss is the erosion of the face of a rail head facing the gage side of railroad tracks. As wheels roll through a curve, the wheels on both the high and low rails can produce a lateral, gauge spreading force. Particularly, wear on the gage face of the rail can be caused by contact loads applied to the side of the rail head by wheel flanges. In one exemplary embodiment, the control logic 600 can display a text field and keyboard on the client to receive user input specifying the left gauge face loss value. The control logic 600 then proceeds to step 650.

Figure 7:
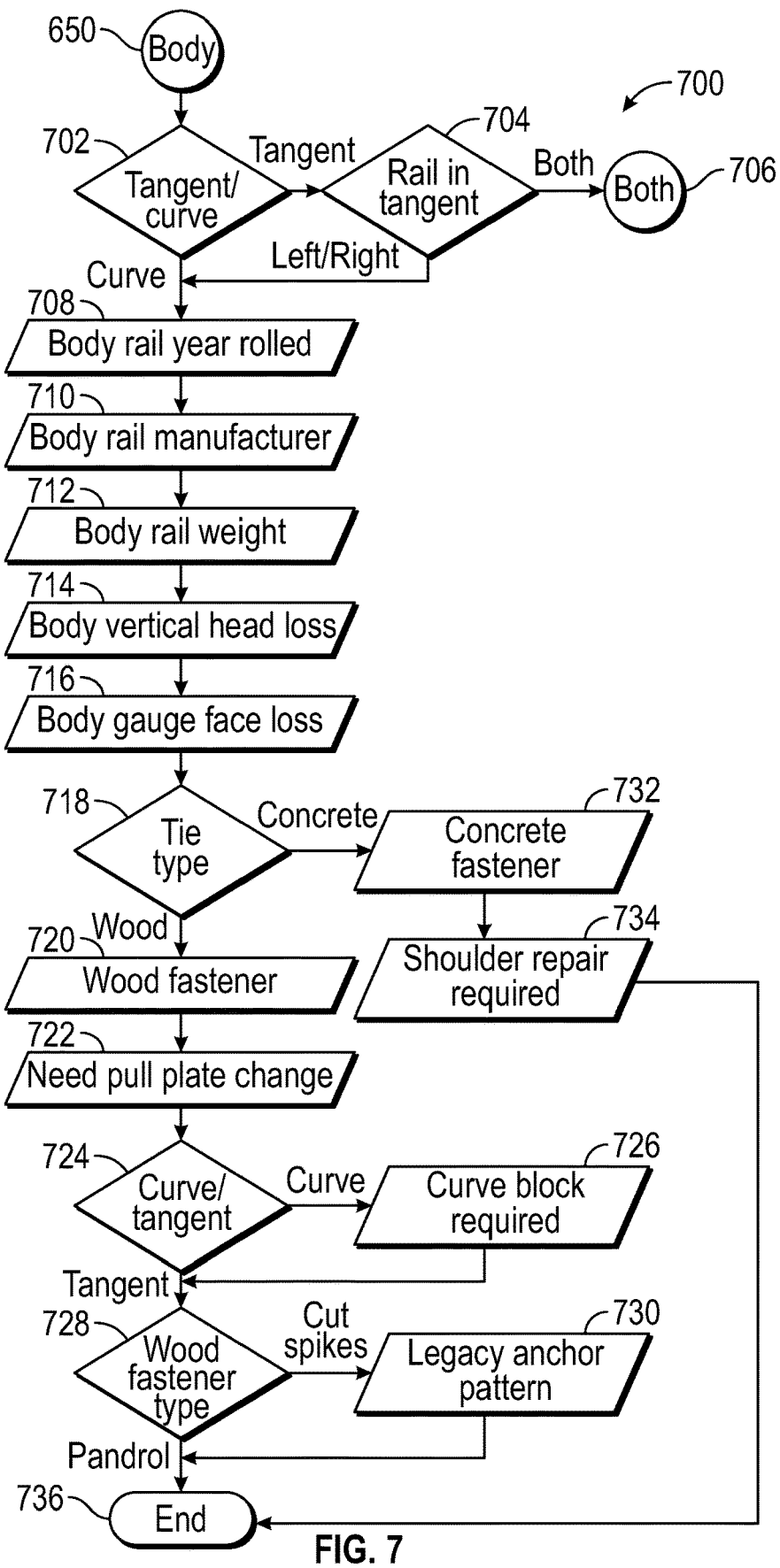
FIG. 7 illustrates a flowchart exemplifying body-flow rail inspection control logic, in accordance with one or more exemplary embodiments of the present disclosure.

At step 650, the control logic 600 can instantiate a body inspection algorithm, as described in more detail in FIG. 7.

FIG. 7 illustrates a flowchart exemplifying body-flow rail inspection control logic 700, in accordance with one or more exemplary embodiments of the present disclosure. The body-flow rail inspection control logic 700 can be implemented as an algorithm on a server 304, a machine learning module, a client 302, a database 306, or other suitable system. Additionally, the body-flow rail inspection control logic 700 can implement or incorporate one or more features of the STAMP inspection system 202, including inspection initialization module 108, geopositioning module 110, asset identification module 112, and inspection generation module 114. The body-flow rail inspection control logic 700 can be achieved with software, hardware, an application programming interface (API), a network connection, a network transfer protocol, HTML, DHTML, JavaScript, Dojo, Ruby, Rails, other suitable applications, or a suitable combination thereof. One or more exemplary embodiments of the body-flow rail inspection control logic 700 may be shown in FIGS. 13A-13B.

The body-flow rail inspection control logic 700 can leverage the ability of a computer platform to spawn multiple processes and threads by processing data simultaneously. The speed and efficiency of the body-flow rail inspection control logic 700 can be greatly improved by instantiating more than one process to implement a body-flow rail inspection. However, one skilled in the art of programming will appreciate that use of a single processing thread may also be utilized and is within the scope of the present disclosure.

The body-flow rail inspection control logic 700 of the present embodiment begins at step 650, where the control logic 700 can receive a body inspection instantiation according to step 650 of FIG. 6. In one exemplary embodiment, the control logic 700 can display one or more questions related to the inspection. In another exemplary embodiment, the control logic 700 can display a Body inspection screen. In another exemplary embodiment, commands or data can be received via user input generated on a client or server, such as a screen tap, swipe, mouse click, key press, voice command, or other suitable mechanism. In another exemplary embodiment, the inspection commands or data can include inspection data having one or more fields, parameters, characteristics, or metadata, related to an inspection. The inspection data can be stored in memory on the client or server. The control logic 700 then proceeds to step 702.

At step 702, the control logic 700 can determine the track geometry. In one exemplary embodiment, the control logic 700 can display one or more options for a track geometry on the client. For example, the track geometry can be a curved track, tangent track, or other suitable track geometry. In another exemplary embodiment the control logic 700 can display an input object to receive the track geometry. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the track geometry into one or more fields, parameters, characteristics, or metadata in memory on the client or server. If the track geometry is tangent, the control logic 700 proceeds to step 704. If the track geometry is curve(d), the control logic 700 proceeds to step 708.

At step 704, the control logic 700 can determine the rail position of the rail to be inspected for a rail in tangent. In one exemplary embodiment, the tangent rail position can be left, right, both, or other suitable position. In another exemplary embodiment the control logic 700 can display an input object to receive the tangent rail position. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the tangent rail position into one or more fields, parameters, characteristics, or metadata in memory on the client or server. If the rail position is left or right, the control logic 700 proceeds to step 708. If the rail position is both, the control logic 700 proceeds to step 706.

At step 706, the control logic 700 can instantiate a Both inspection algorithm, as described in more detail at step 614 of FIG. 6. Once the Both inspection algorithm is completed, the control logic 700 can proceed to step 708.

At step 708, the control logic 700 can receive a year that the body rail was rolled (laid). In another exemplary embodiment the control logic 700 can display an input object to receive the roll year. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the roll year into one or more fields, parameters, characteristics, or metadata in memory on the client or server. The control logic then proceeds to step 710.

At step 710, the control logic 700 can receive a manufacturer name for the body rail. In another exemplary embodiment the control logic 700 can display an input object to receive the manufacturer name. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the manufacturer name into one or more fields, parameters, characteristics, or metadata in memory on the client or server. The control logic then proceeds to step 712.

At step 712, the control logic 700 can receive a weight of the rail body. In another exemplary embodiment the control logic 700 can display an input object to receive the rail weight. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the rail weight into one or more fields, parameters, characteristics, or metadata in memory on the client or server. The control logic then proceeds to step 714.

At step 714, the control logic 700 can receive a vertical head loss value for the rail body. In another exemplary embodiment the control logic 700 can display an input object to receive the vertical head loss value. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the vertical head loss value into one or more fields, parameters, characteristics, or metadata in memory on the client or server. The control logic then proceeds to step 716.

At step 716, the control logic 700 can receive a gauge face loss value for the rail body. In another exemplary embodiment the control logic 700 can display an input object to receive the gauge face loss value. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the gauge face loss value into one or more fields, parameters, characteristics, or metadata in memory on the client or server. The control logic then proceeds to step 718.

At step 718, the control logic 700 can determine the tie type. In another exemplary embodiment the control logic 700 can display an input object to receive the tie type. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the tie type into one or more fields, parameters, characteristics, or metadata in memory on the client or server. If the tie type is concrete, the control logic 700 proceeds to step 732. If the tie type is wood, the control logic 700 proceeds to step 720.

At step 732, the control logic 700 can receive a concrete fastener selection for the rail tie. In another exemplary embodiment the control logic 700 can display an input object to receive the concrete fastener selection. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the concrete fastener selection into one or more fields, parameters, characteristics, or metadata in memory on the client or server. The control logic then proceeds to step 734.

At step 734, the control logic 700 can receive an indication as to whether shoulder repair is required. In another exemplary embodiment the control logic 700 can display an input object to receive the shoulder repair indication. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the shoulder repair indication into one or more fields, parameters, characteristics, or metadata in memory on the client or server. The control logic then proceeds to step 736.

At step 720, the control logic 700 can receive a wood fastener selection for the rail tie. In another exemplary embodiment the control logic 700 can display an input object to receive the wood fastener selection. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the wood fastener selection into one or more fields, parameters, characteristics, or metadata in memory on the client or server. The control logic then proceeds to step 722.

At step 722, the control logic 700 can receive an indication as to whether a pull plate change is required. In another exemplary embodiment the control logic 700 can display an input object to receive the pull plate change indication. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the pull plate change indication into one or more fields, parameters, characteristics, or metadata in memory on the client or server. The control logic then proceeds to step 724.

At step 724, the control logic 700 verifies the track geometry for the wood tie type selections. In one exemplary embodiment, the control logic 700 can retrieve the track geometry for this inspection stored in memory on the client or server. If the track geometry is tangent, the control logic 700 proceeds to step 728. If the track geometry is curve(d), the control logic 700 proceeds to step 726.

At step 726, the control logic 700 can receive an indication as to whether a curve block is required. In another exemplary embodiment the control logic 700 can display an input object to receive the curve block indication. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the curve block indication into one or more fields, parameters, characteristics, or metadata in memory on the client or server. The control logic then proceeds to step 728.

At step 728, the control logic 700 can determine the wood fastener type. In another exemplary embodiment the control logic 700 can display an input object to receive the wood fastener type. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the wood fastener type into one or more fields, parameters, characteristics, or metadata in memory on the client or server. If the wood fastener type is cut spikes, the control logic 700 proceeds to step 730. If the wood fastener type is Pandrol®, the control logic 700 proceeds to step 736.

At step 730, the control logic 700 can receive an indication as to whether a legacy anchor pattern should be used. In another exemplary embodiment the control logic 700 can display an input object to receive the legacy anchor pattern indication. For example, input objects such as text boxes, radio buttons, check boxes, or other suitable input object can be displayed by the control logic 700 on the client or server. In another exemplary embodiment, the input object can be configured to receive user input, such as a screen tap, swipe, mouse click, key press, voice command, or other suitable mechanism. In another exemplary embodiment, the control logic 700 can store the legacy anchor pattern indication into one or more fields, parameters, characteristics, or metadata in memory on the client or server. The control logic then proceeds to step 736.

Figure 8:
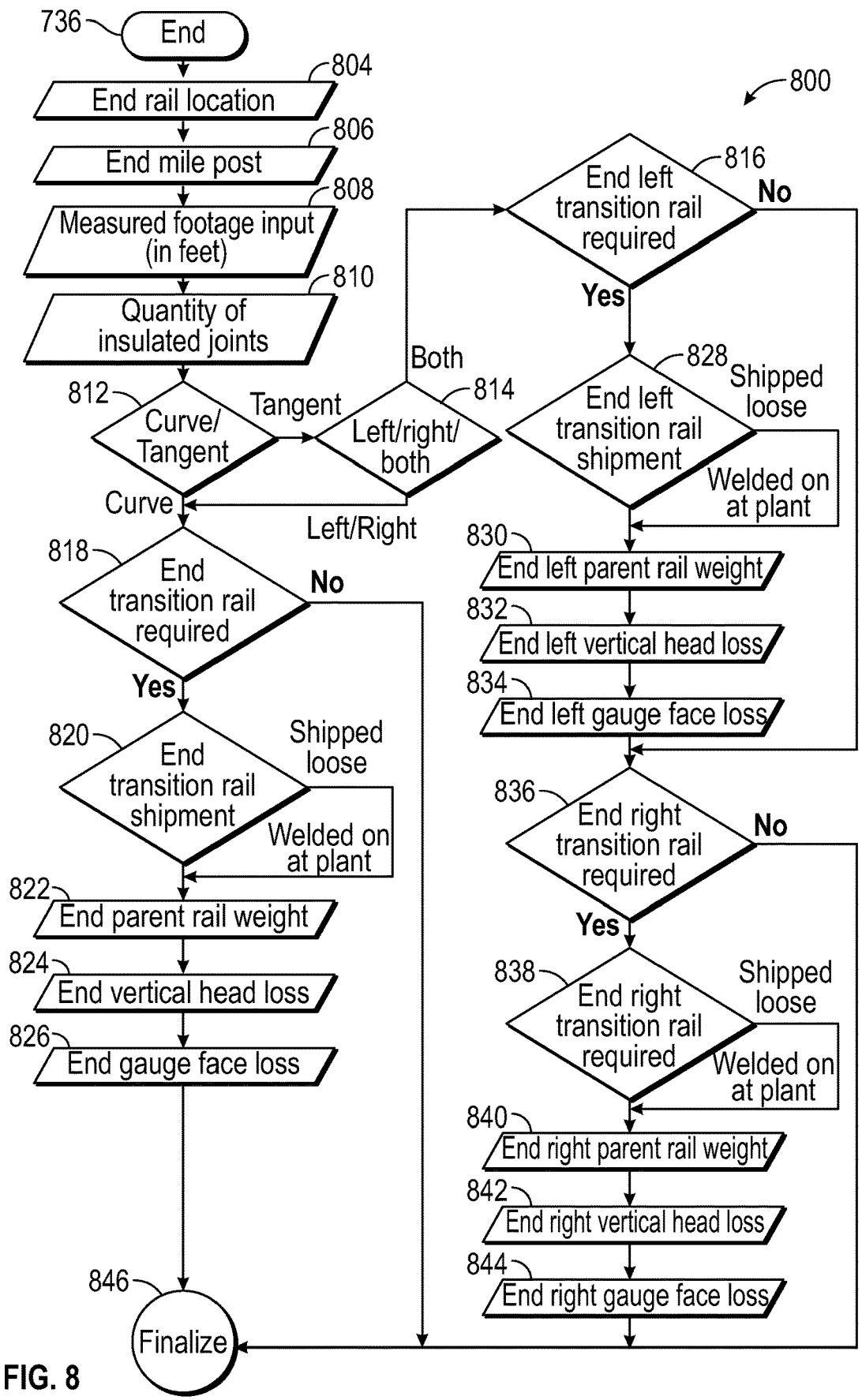
FIG. 8 illustrates a flowchart exemplifying rail inspection termination control logic, in accordance with one or more exemplary embodiments of the present disclosure.

At step 736, the control logic 700 can instantiate an End inspection algorithm, as described in more detail in FIG. 8.

FIG. 8 illustrates a flowchart exemplifying rail inspection termination control logic 800, in accordance with one or more exemplary embodiments of the present disclosure. The inspection termination control logic 800 can be implemented as an algorithm on a server 304, a machine learning module, a client 302, a database 306, or other suitable system. Additionally, the rail inspection termination control logic 800 can implement or incorporate one or more features of the STAMP inspection system 202, including inspection initialization module 108, geopositioning module 110, asset identification module 112, and inspection generation module 114. The inspection termination control logic 800 can be achieved with software, hardware, an application programming interface (API), a network connection, a network transfer protocol, HTML, DHTML, JavaScript, Dojo, Ruby, Rails, other suitable applications, or a suitable combination thereof. One or more exemplary embodiments of the inspection termination control logic 800 may be shown in FIG. 14A.

The inspection termination control logic 800 can leverage the ability of a computer platform to spawn multiple processes and threads by processing data simultaneously. The speed and efficiency of the inspection termination control logic 800 can be greatly improved by instantiating more than one process to implement a tangent-flow rail inspection. However, one skilled in the art of programming will appreciate that use of a single processing thread may also be utilized and is within the scope of the present disclosure.

The inspection termination control logic 800 of the present embodiment begins at step 736, where the control logic 800 can receive an End inspection instantiation according to step 736 of FIG. 7. In one exemplary embodiment, the control logic 800 can display one or more questions related to the termination of the inspection. In another exemplary embodiment, the control logic 800 can display an End inspection screen. In another exemplary embodiment, commands or data can be received via user input generated on a client or server, such as a screen tap, swipe, mouse click, key press, voice command, or other suitable mechanism. In another exemplary embodiment, the inspection commands or data can include inspection data having one or more fields, parameters, characteristics, or metadata, related to an inspection. The inspection data can be stored in memory on the client or server. The control logic 800 then proceeds to step 804.

At step 804, the control logic 800 can determine the ending rail location of the client. In one exemplary embodiment, the control logic 800 can display an input object to receive the ending rail location. For example, input objects such as text boxes, radio buttons, check boxes, or other suitable input object can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending rail location into one or more fields, parameters, characteristics, or metadata in memory on the client or server. In another exemplary embodiment, the control logic 800 can instantiate the GPS functionality of the client to determine the client's location. For example, the control logic 800 can receive the latitude and longitude coordinates of the client from the geopositioning module or GPS device. The control logic 800 then proceeds to step 806.

At step 806, the control logic 800 can receive an ending mile post value. In one exemplary embodiment, the control logic 800 can display an input object to receive the ending mile post value. For example, input objects such as text boxes, radio buttons, check boxes, or other suitable input object can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending mile post value into one or more fields, parameters, characteristics, or metadata in memory on the client or server. In another exemplary embodiment, the control logic 800 can overwrite the received GPS latitude and longitude coordinates when the mile post is indicated. The control logic 800 then proceeds to step 808.

At step 808, the control logic 800 can receive the measured footage. In one exemplary embodiment, the control logic 800 can display an input object to receive the measured footage. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the measured footage into one or more fields, parameters, characteristics, or metadata in memory on the client or server. In another exemplary embodiment, the measured footage can have any input unit (e.g., feet, meters, or miles). In another exemplary embodiment the control logic 800 can convert the units received into feet. The control logic 800 then proceeds to step 810.

At step 810, the control logic 800 can receive the quantity of insulated joints. In one exemplary embodiment, the control logic 800 can display an input object to receive the insulated joint quantity. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the insulated joint quantity into one or more fields, parameters, characteristics, or metadata in memory on the client or server. In another exemplary embodiment, the measured footage can have any input unit (e.g., feet, meters, or miles). The control logic 800 then proceeds to step 812.

At step 812, the control logic 800 can verifies the track geometry. In one exemplary embodiment, the control logic 800 can retrieve the track geometry for this inspection stored in memory on the client or server. In another exemplary embodiment, the track geometry can be determined via user input from the client. If the track geometry is tangent, the control logic 800 proceeds to step 814. If the track geometry is curve(d), the control logic 800 proceeds to step 818.

At step 814, the control logic 800 can determine the rail position to be inspected for a rail in tangent. In one exemplary embodiment, the tangent rail position can be left, right, both, or other suitable position. If the rail position is left or right, the control logic 800 proceeds to step 818. If the rail position is both, the control logic 800 proceeds to step 816.

At step 818, the control logic 800 can receive an indication of whether an ending transition rail is required. A transition rail is a track component that can connect two different rail sections. In one exemplary embodiment, the control logic 800 can display an input object to receive the ending transition rail indication. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending transition rail indication into one or more fields, parameters, characteristics, or metadata in memory on the client or server. If an ending transition rail is required, the control logic proceeds to step 820. If an ending transition rail is not required, the control logic 800 proceeds to step 846.

At step 820, the control logic 800 receives an indication whether the ending transition rail is shipped loose or welded on at the plant. In one exemplary embodiment, the control logic 800 can display an input object to receive the ending transition rail shipment indication. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending transition rail shipment indication into one or more fields, parameters, characteristics, or metadata in memory on the client or server. If the ending transition rail shipment is shipped loose, the control logic 800 proceeds to step 822. If the ending transition rail shipment is welded on at the plant, the control logic 800 proceeds to step 822.

At step 822, the control logic 800 can receive an ending parent rail weight. In one exemplary embodiment, the control logic 800 can display an input object to receive the ending parent rail weight. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending parent rail weight into one or more fields, parameters, characteristics, or metadata in memory on the client or server. For example, rail weights can range between 100 lbs. and 150 lbs. The control logic 800 then proceeds to step 824.

At step 824, the control logic 800 can receive a vertical head loss value. For example, vertical head loss is the shortening of a rail head due to locomotive travel over the rail. In one exemplary embodiment, the control logic 800 can display an input object to receive the vertical head loss value. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the vertical head loss value into one or more fields, parameters, characteristics, or metadata in memory on the client or server. The control logic then proceeds to step 826.

At step 826, the control logic 800 can receive a gauge face loss value. For example, gauge face loss is the erosion of the face of a rail head facing the gage side of railroad tracks. As wheels roll through a curve, the wheels on both the high and low rails can produce a lateral, gauge spreading force. Particularly, wear on the gage face of the rail can be caused by contact loads applied to the side of the rail head by wheel flanges. In one exemplary embodiment, the control logic 800 can display an input object to receive the gauge face loss value. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the gauge face loss value into one or more fields, parameters, characteristics, or metadata in memory on the client or server. The control logic 800 then proceeds to step 846.

At step 816, the control logic 800 can receive an indication of whether an ending left transition rail is required. A transition rail is a track component that can connect two different rail sections. In one exemplary embodiment, the control logic 800 can display an input object to receive the ending left transition rail indication. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending left transition rail indication into one or more fields, parameters, characteristics, or metadata in memory on the client or server. If an ending left transition rail is required, the control logic 800 proceeds to step 828. If an ending left transition rail is not required, the control logic 800 proceeds to step 836.

At step 828, the control logic 800 receives an indication whether the ending left transition rail is shipped loose or welded on at the plant. In one exemplary embodiment, the control logic 800 can display an input object to receive the ending left transition rail shipment indication. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending left transition rail shipment indication into one or more fields, parameters, characteristics, or metadata in memory on the client or server. If the ending left transition rail shipment is shipped loose, the control logic 800 proceeds to step 830. If the ending left transition rail shipment is welded on at the plant, the control logic 800 proceeds to step 830.

At step 830, the control logic 800 can receive an ending parent rail weight for the left rail. In one exemplary embodiment, the control logic 800 can display an input object to receive the ending left rail parent rail weight. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending left rail parent rail weight into one or more fields, parameters, characteristics, or metadata in memory on the client or server. For example, rail weights can range between 100 lbs. and 150 lbs. The control logic 800 then proceeds to step 832.

At step 832, the control logic 800 can receive a vertical head loss value for the left rail. For example, vertical head loss is the shortening of a rail head due to locomotive travel over the rail. In one exemplary embodiment, the control logic 800 can display an input object to receive the left rail vertical head loss value. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the left rail vertical head loss value into one or more fields, parameters, characteristics, or metadata in memory on the client or server. The control logic then proceeds to step 834.

At step 834, the control logic 800 can receive an ending gauge face loss value for the left rail. For example, gauge face loss is the erosion of the face of a rail head facing the gage side of railroad tracks. As wheels roll through a curve, the wheels on both the high and low rails can produce a lateral, gauge spreading force. Particularly, wear on the gage face of the rail can be caused by contact loads applied to the side of the rail head by wheel flanges. In one exemplary embodiment, the control logic 800 can display an input object to receive the ending left rail gauge face loss value. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending left rail gauge face loss value into one or more fields, parameters, characteristics, or metadata in memory on the client or server. The control logic 800 then proceeds to step 836.

At step 816, the control logic 800 can receive an indication of whether an ending transition rail is required for the right rail. A transition rail is a track component that can connect two different rail sections. In one exemplary embodiment, the control logic 800 can display an input object to receive the ending right transition rail indication. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending right transition rail indication into one or more fields, parameters, characteristics, or metadata in memory on the client or server. If an ending right transition rail is required, the control logic 800 proceeds to step 838. If an ending right transition rail is not required, the control logic 800 proceeds to step 846.

At step 828, the control logic 800 can receive an indication of whether the ending right transition rail is shipped loose or welded on at the plant. In one exemplary embodiment, the control logic 800 can display an input object to receive the ending right transition rail shipment indication. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending right transition rail shipment indication into one or more fields, parameters, characteristics, or metadata in memory on the client or server. If the ending right transition rail shipment is shipped loose, the control logic 800 proceeds to step 840. If the ending right transition rail shipment is welded on at the plant, the control logic 800 proceeds to step 840.

At step 840, the control logic 800 can receive an ending parent rail weight for the right rail. In one exemplary embodiment, the control logic 800 can display an input object to receive the ending right rail parent rail weight. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending right rail parent rail weight into one or more fields, parameters, characteristics, or metadata in memory on the client or server. For example, rail weights can range between 100 lbs. and 150 lbs. The control logic 800 then proceeds to step 842.

At step 842, the control logic 800 can receive a vertical head loss value for the right rail. For example, vertical head loss is the shortening of a rail head due to locomotive travel over the rail. In one exemplary embodiment, the control logic 800 can display an input object to receive the right rail vertical head loss value. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the right rail vertical head loss value into one or more fields, parameters, characteristics, or metadata in memory on the client or server. The control logic then proceeds to step 844.

At step 844, the control logic 800 can receive an ending gauge face loss value for the right rail. For example, gauge face loss is the erosion of the face of a rail head facing the gage side of railroad tracks. As wheels roll through a curve, the wheels on both the high and low rails can produce a lateral, gauge spreading force. Particularly, wear on the gage face of the rail can be caused by contact loads applied to the side of the rail head by wheel flanges. In one exemplary embodiment, the control logic 800 can display an input object to receive the ending right rail gauge face loss value. For example, input objects such as text boxes, radio buttons, check boxes, or other suitable input objects can be displayed by the control logic 800 on the client or server. In another exemplary embodiment, the input object can be configured to receive user input, such as a screen tap, swipe, mouse click, key press, voice command, or other suitable mechanism. In another exemplary embodiment, the control logic 800 can store the ending right rail gauge face loss value into one or more fields, parameters, characteristics, or metadata in memory on the client or server. The control logic 800 then proceeds to step 846.

Figure 9:
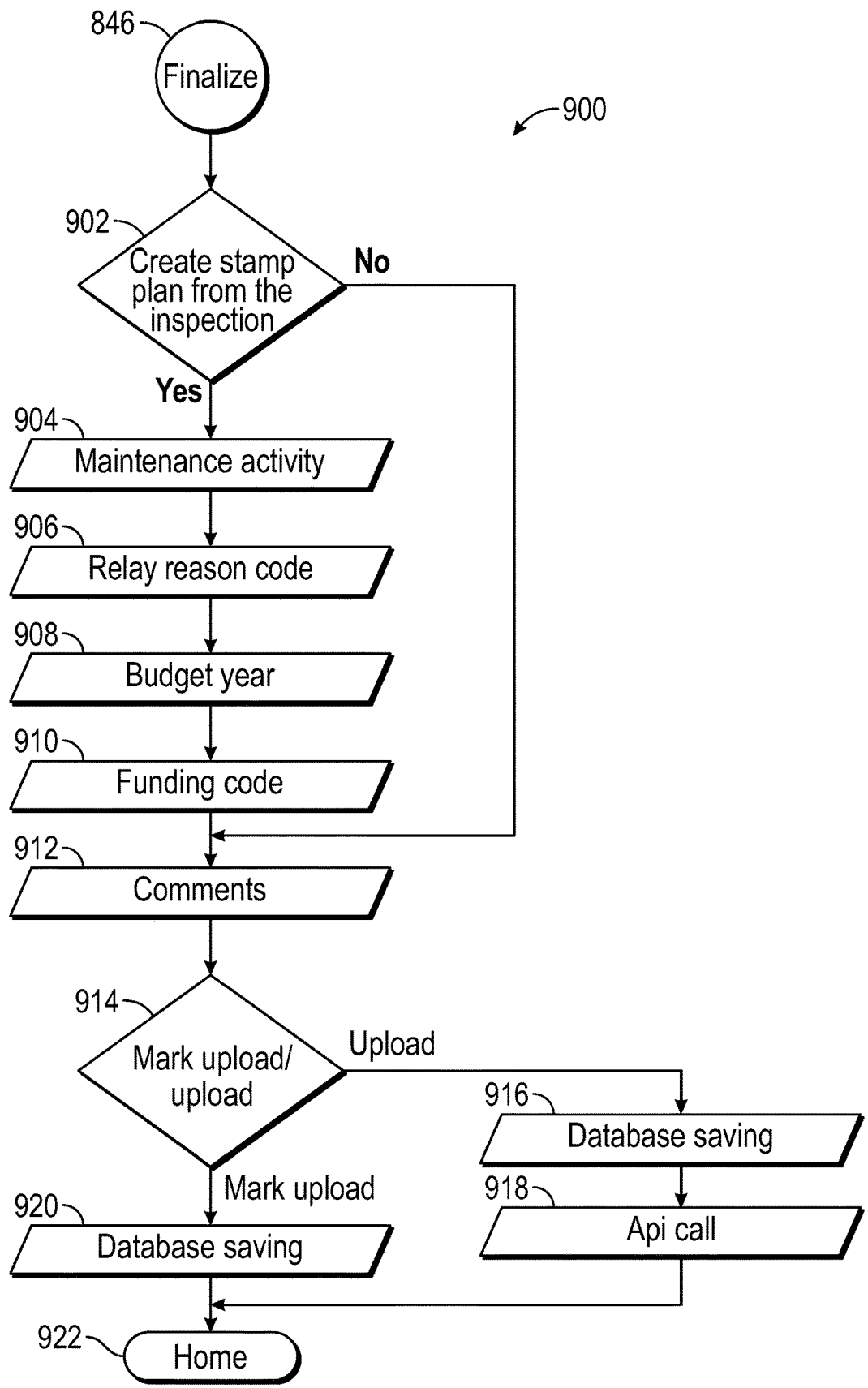
FIG. 9 illustrates a flowchart exemplifying rail inspection finalization control logic, in accordance with one or more exemplary embodiments of the present disclosure.

At step 846, the control logic 800 can instantiate a Finalize inspection algorithm, as described in more detail in FIG. 9.

FIG. 9 illustrates a flowchart exemplifying rail inspection finalization control logic 900, in accordance with one or more exemplary embodiments of the present disclosure. The rail inspection finalization control logic 900 can be implemented as an algorithm on a server 304, a machine learning module, a client 302, a database 306, or other suitable system. Additionally, the it inspection finalization control logic 900 can implement or incorporate one or more features of the STAMP planning system 206, including plan initialization module 116, asset association module 118, and plan generation module 120. The rail inspection finalization control logic 900 can be achieved with software, hardware, an application programming interface (API), a network connection, a network transfer protocol, HTML, DHTML, JavaScript, Dojo, Ruby, Rails, other suitable applications, or a suitable combinations thereof. One or more exemplary embodiments of the inspection termination control logic 800 may be shown in FIGS. 14B-14D.

The rail inspection finalization control logic 900 can leverage the ability of a computer platform to spawn multiple processes and threads by processing data simultaneously. The speed and efficiency of the rail inspection finalization control logic 900 can be greatly improved by instantiating more than one process to implement an inspection finalization. However, one skilled in the art of programming will appreciate that use of a single processing thread may also be utilized and is within the scope of the present disclosure.

The rail inspection finalization control logic 900 of the present embodiment begins at step 846, where the control logic 900 can receive a Finalize inspection instantiation according to step 846 of FIG. 8. In one exemplary embodiment, the control logic 900 can display one or more questions related to the finalization of the inspection. In another exemplary embodiment, the control logic 900 can display a Finalize inspection screen. In another exemplary embodiment, any inspection finalization commands or data can be received via user input generated on a client or server, such as a screen tap, swipe, mouse click, key press, voice command, or other suitable mechanism. In another exemplary embodiment, the inspection finalization commands or data can include inspection data having one or more fields, parameters, characteristics, or metadata, related to an inspection. All inspection finalization data can be stored in memory on the client or server. The control logic 900 then proceeds to step 902.

At step 902, the control logic 900 can receive an indication of whether a STAMP capital plan should be created. In another exemplary embodiment, the control logic 900 can auto-populate the indication of whether a STAMP capital plan should be created from inspection data, historical data, or as determined by the STAMP system. If a STAMP plan should be created, the control logic 900 proceeds to step 904. If a STAMP plan should not be created, the control logic 900 proceeds to step 912.

At step 904, the control logic 900 can receive a maintenance activity. For example, maintenance activities can include relay-wood, gauge, or other suitable maintenance activity. In another exemplary embodiment, the control logic 900 can auto-populate the maintenance activity from inspection data, historical data, or as determined by the STAMP system. The control logic 900 then proceeds to step 906.

At step 906, the control logic 900 can receive a relay reason code. For example, maintenance activities can include combined rail wear, gauge face loss, vertical head loss, internal defects, surface defects, rail exception, bolted, or other suitable reason code. In another exemplary embodiment, the control logic 900 can auto-populate the relay reason code from inspection data, historical data, or as determined by the STAMP system. The control logic 900 then proceeds to step 908.

At step 908, the control logic 900 can receive a budget year for the plan. In one exemplary embodiment, the control logic 900 can auto-populate the budget year from inspection data, historical data, or as determined by the STAMP system. The control logic 900 then proceeds to step 910.

At step 910, the control logic 900 can receive a funding code. For example, funding codes can include codes related to the territory, technology, model, or other suitable code. In another exemplary embodiment, the control logic 900 can auto-populate the funding code from inspection data, historical data, or as determined by the STAMP system. The control logic 900 then proceeds to step 912.

At step 912, the control logic 900 can receive comments related to the plan. For example, funding codes can include codes related to the territory, technology, model, or other suitable code. In another exemplary embodiment, the control logic 900 can auto-populate the comments from inspection data, historical data, or as determined by the STAMP system. The control logic 900 then proceeds to step 914.

At step 914, the control logic 900 can receive an indication of whether a STAMP capital plan should be uploaded or marked for upload. For example, a plan can be directly uploaded to the STAMP system from the client, or it can be marked for upload at a later time. In another exemplary embodiment, if the client lacks network connectivity, the plan can be marked for upload once the client regains network connectivity. If a STAMP plan should be uploaded, the control logic 900 proceeds to step 916. If a STAMP plan should be marked for upload, the control logic 900 proceeds to step 920.

At step 914, the control logic 900 can save the plan to database. In one exemplary embodiment, the control logic 900 can call the authentication module to generate an authentication token for STAMP system access. The control logic can transfer the plan to the STAMP system to save the plan in a database in the memory. The control logic 900 then proceeds to step 918.

At step 918, the control logic 900 can make an API call to access or process plan data. In one exemplary embodiment, the API can reside on the STAMP system. In another exemplary embodiment, the API can be operatively coupled to the WebUI. The control logic 900 then proceeds to step 922.

At step 922, the control logic 900 can receive a Home inspection command to instantiate the STAMP dashboard system 204. In one exemplary embodiment, the control logic 900 can display a Home screen. In another exemplary embodiment, any commands or data can be received via user input generated on a client or server, such as a screen tap, swipe, mouse click, key press, voice command, or other suitable mechanism. In another exemplary embodiment, the commands or data can include inspection data having one or more fields, parameters, characteristics, or metadata, related to an inspection. All inspection data can be stored in memory on the client or server.

Figure 10:
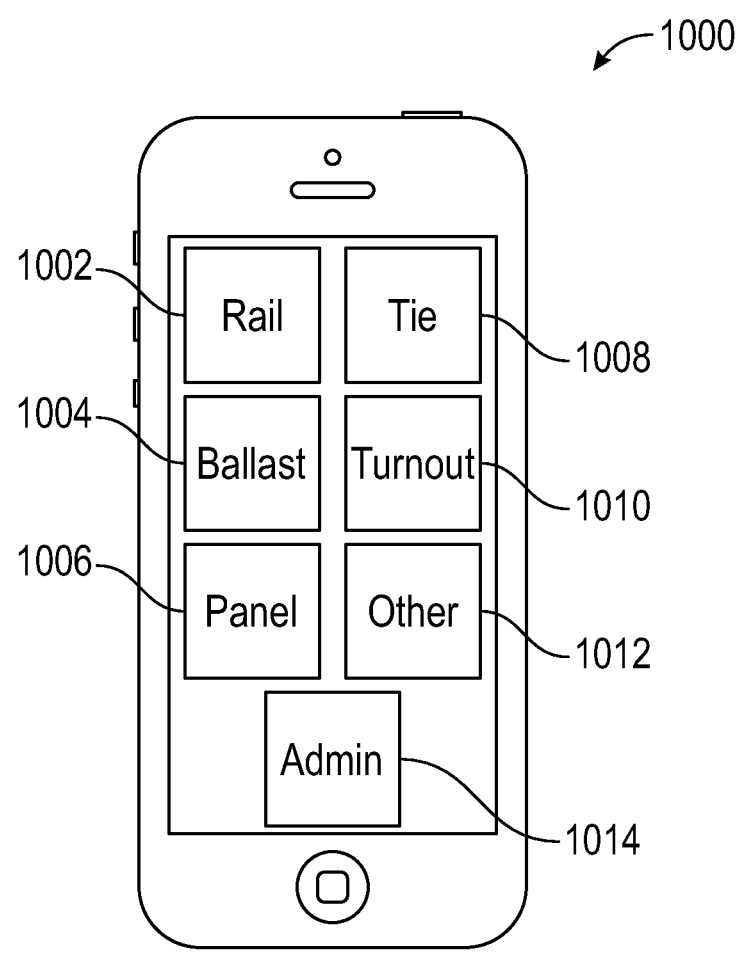
FIG. 10 illustrates an exemplary embodiment of a STAMP inspection system interface, in accordance with one or more exemplary embodiments of the present disclosure.

FIG. 10 illustrates an exemplary embodiment of a STAMP inspection system interface, in accordance with one or more exemplary embodiments of the present disclosure. In one exemplary embodiment, an asset selection screen 1000 can be displayed on a client. In another exemplary embodiment, a client can display one or more icons to select a railroad asset. For example, a client processor can display on the client an icon for a rail 1002, a ballast 1004, a panel 1006, a tie 1008, a turnout 1010, other 1012, and an admin 1014, among other relevant asset. The icons can assign an asset type and instantiate one or more algorithms related to the asset type. For example, selection of an asset type icon can result in the display of another screen, or the presentation of prompts related to the railroad asset type.

FIGS. 11A-11E illustrate an exemplary embodiment of an inspection creation interface, in accordance with one or more exemplary embodiments of the present disclosure. With regard to FIG. 11A, there is shown a Home (dashboard) screen 1100. In one exemplary embodiment, the Home screen 1100 can include one or more icons that can instantiate one or more processes or algorithms. An icon can include text, an image, and/or a software object. For example, the Home screen 1100 can include a Home icon 1102, a Create Inspection icon 1104, a Download Plan icon 1106, a Search Inspections icon 1108, and a More icon 1110, among other relevant icons. In another exemplary embodiment, the Home screen 1100 can include a label 1112 to categorize various inspections and/or capital plans. For example, the label 1112 can include a listing of recently worked assignments, future assignments, and current assignments, among other relevant categories. For an assignment (e.g., inspection, plan, etc.) that was recently worked, under the RECENTLY WORKED label 1112, the Home screen 1100 can display a status 1114, a project description 1116, a timestamp 1118, a task ID, a location, or other relevant information related to the assignment. In another exemplary embodiment, the Home screen 1100 can include an Upload All icon 1119 that can facilitate the transfer of one or more assignments to a database. The Upload All icon 1119 can instantiate the Authentication module 126 to facilitate data transfer.

With regard to FIG. 11B, there is shown a Create Inspection screen 1120. In one exemplary embodiment, the Create Inspection screen 1120 can be displayed upon the selection of the Create Inspection icon 1104. In another exemplary embodiment, the Create Inspection screen 1120 can display a project description prompt with a corresponding project description input object 1122. In another exemplary embodiment, a networked processor can display an input object on the client to receive user input. The networked processor can prompt the user by displaying a button, graphic, or other suitable widget on the client. For example, input objects such as text boxes, radio buttons, check boxes, or other suitable input objects can be displayed by the networked processor on the client or server. In another exemplary embodiment, the input object can be configured to receive user input, such as a screen tap, swipe, mouse click, key press, voice command, or other suitable mechanism. For example, the networked processor can display a textbox and keyboard on the client to receive the project description. In another exemplary embodiment, the networked processor can save or update a project description to a database on the client or server.

With regard to FIG. 11C, there is shown a Create Inspection screen 1120. In another exemplary embodiment, once the project description is received, the networked processor can display prompts to receive asset descriptions related to an asset inspection. For example, the networked processor can display a Select Track Geometry prompt 1132 with corresponding input objects, a Specify Track Type prompt 1134 with corresponding input object, or other suitable prompt with corresponding input object. Once data is entered or selected using the input object, the data can be stored in a field in a database related to the prompt. In another exemplary embodiment, once all of the required asset description data is received, a Start Inspection icon 1136 can be displayed on the Create Inspection screen 1120 to launch an inspection begin screen or other suitable display screen on the client.

Figures 11D, 11E:
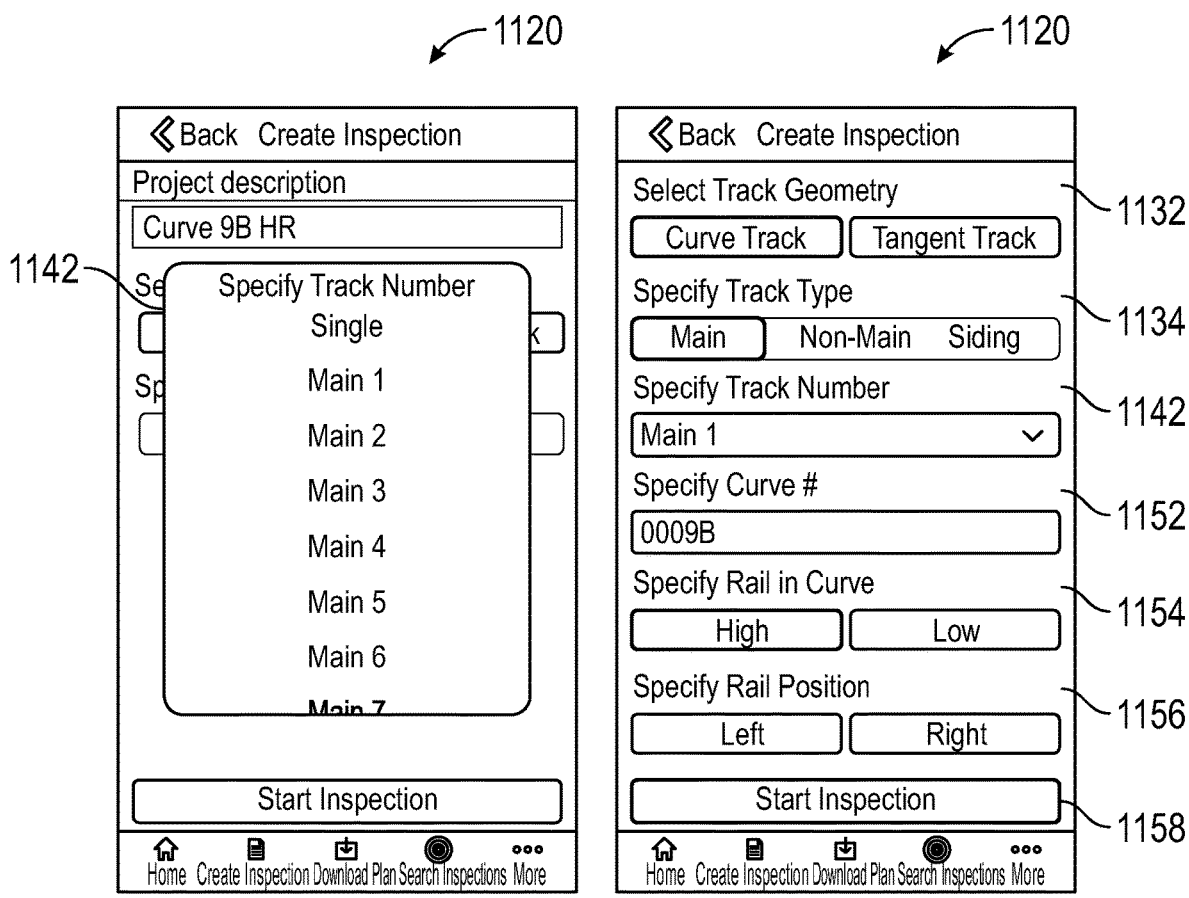

At FIGS. 11D-11E, after an inspection is initiated, prompts relevant to the asset type can be displayed by the networked processor. In another exemplary embodiment, when a specify track number prompt 1142 is displayed, the input object can be a selection list 1143 related to a specify track number prompt 1142 that displays in a window that overlays at least a portion of the client display. For a particular asset type for asset description, the network processor can display one or more prompts related thereto. For example, the networked processor can display a specified curve member prompt 1152, can you specify rail in curve prompt 1154, specify rail position prompt 1156, or other suitable prompt related to the asset type for asset description. Each prompt can have a corresponding input object related thereto. Upon receiving a response to a prompt, the networked processor can retrieve one or more criteria for a description from the database. The criteria can be displayed as prompts on the client. Once all relevant asset description responses are received, the processor can start an inspection.

Figures 12A, 12B:
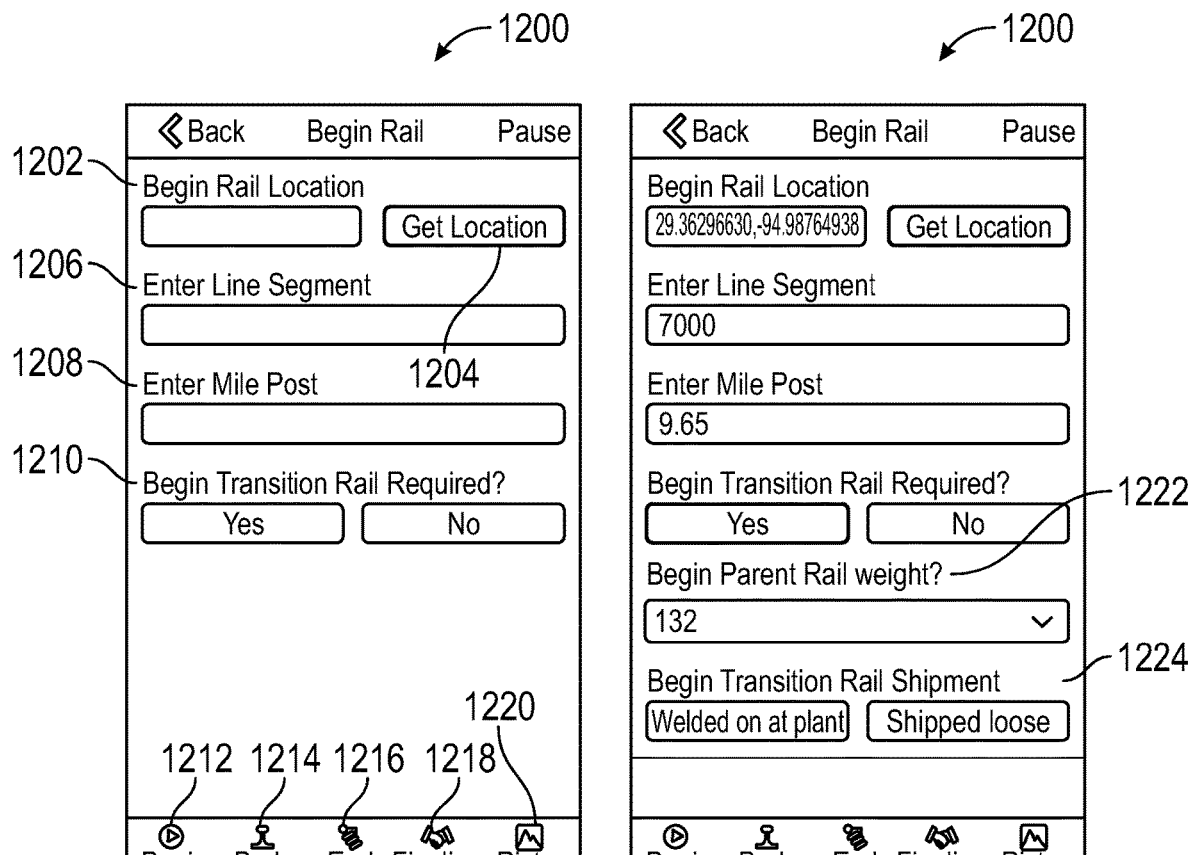
FIGS. 12A-12B illustrate an exemplary embodiment of an inspection workflow interface, in accordance with one or more exemplary embodiments of the present disclosure.

FIGS. 12A-12B illustrate an exemplary embodiment of an inspection workflow interface, in accordance with one or more exemplary embodiments of the present disclosure. FIGS. 12A-12B, shown a Begin Rail screen 1200. In one exemplary embodiment, the Begin Rail screen 1200 can include one or more icons that can instantiate one or more processes or algorithms. An icon can include text, an image, and/or a software object. For example, the Begin Rail screen 1200 can include a Begin icon 1212, a Body icon 1214, an End icon 1216, a Finalize icon 1218, and a Picture icon 1220, among other relevant icons. In another exemplary embodiment, each of the icons 1212, 1214, 1216, 1218, and 1218 can correspond to a different aspect of an asset inspection workflow. In another exemplary embodiment, each the icons 1212, 1214, 1216, 1218, and 1218 can be displayed based upon the inspection workflow for the received asset type. In another exemplary embodiment, the Begin Rail screen 1200 can include one or more icons that can instantiate one or more processes or algorithms.

In one exemplary embodiment, a Begin Rail Location prompt 1202 can be displayed on the client via the networked processor. In another exemplary embodiment, the rail location can be determined via GPS coordinates received by the selection of a get location input object 1204. For example, the GPS coordinates can include a latitude and longitude value. In another exemplary environment, the Begin Rail Location can be determined from user input into a text box input object associated with prompt and Enter Line Segment prompt 1206 can be displayed on the client, as well as an Enter Mile Post prompt 1208. In one exemplary embodiment, data input into the input object for the Enter Line Segment 1206 or the Enter Mile Post 1208, can result in overriding the latitude and longitude coordinates received from the GPS device. The network processor can display a Begin Transition Rail Required prompt 1210 to determine whether prompts related to a transition rail should be displayed. If the processor receives "no" as an input, the networked processor can skip the prompts for the transition rail inspection. the processor receives "yes" as an input, the networked processor can display the prompts for the transition rail inspection. For example, the processor can display at least a prompt for a Begin Parent Rail weight 1222 and a prompt for a Begin Transition Rail Shipment 1224 related to the "yes" transition rail prompt.

FIGS. 13A-13B illustrate an exemplary embodiment of a body annotation interface, in accordance with one or more exemplary embodiments of the present disclosure. A processor can display a Body screen 1300 having one or more prompts related to the asset type, asset description, location, or other suitable data. For example, the Body screen 1300 can include inspection prompts for Body Rail Year Rolled 1302, Body Rail Manufacturer 1304, Body Rail Weight 1308, Body Vertical Head Loss 1310, Body Gauge Face Loss 1312, Tie Type 1314, Wood Fastener 1316, and Need Full Plate Change 1318. As before, each prompt can include a corresponding input object. In another exemplary embodiment, the input object can be stored in a field in a database. In another exemplary embodiment the field name for an input object can be the prompt name or a unique identifier associated with the prompt.

FIGS. 14A-14G illustrate an exemplary embodiment of an inspection termination interface, in accordance with one or more exemplary embodiments of the present disclosure. With regard to FIG. 14A, there is shown an End Rail screen 1400. In one exemplary embodiment, the End Rail screen 1400 can include one or more icons that can instantiate one or more processes or algorithms. An icon can include text, an image, and/or a software object. In another exemplary embodiment, an End Rail Location prompt 1402 can be displayed on the client via the networked processor. In another exemplary embodiment, the rail location can be determined via GPS coordinates received by the selection of a Get Location input object 1404. For example, the GPS coordinates can include a latitude and longitude value. In another exemplary embodiment, the End Rail Location can be determined from user input into a text box input object associated with prompt and Enter Mile Post prompt 1406 can be displayed on the client. In another exemplary embodiment, data input into the input object for the Enter Mile Post 1208, can result in overriding the latitude and longitude coordinates received from the GPS device. In another exemplary embodiment, the network processor can display a Measured Footage Input 1408, an Enter Quantity of Insulated Joints prompt 1410, or other suitable prompt. The network processor can display an End Transition Rail Required prompt 1412 to determine whether prompts related to ending a transition rail should be displayed. If the processor receives "no" as an input, the networked processor can skip the prompts for the end transition rail inspection. If the processor receives "yes" as an input, the networked processor can display the prompts for the transition rail inspection. For example, the processor can display prompts related to the end transition rail situation. The End Transition Rail Required prompt can only be displayed if the Transition Rail Required was determined to be "yes." In another exemplary embodiment, a Pause icon can be displayed on any screen to pause the inspection capture and save the responses received.

Figures 14A, 14B, 14C, 14D:

With regard to FIGS. 14B-14D, there is shown a Finalize screen 1420. In one exemplary embodiment, the Finalize screen 1420 can include one or more icons that can instantiate one or more processes or algorithms. An icon can include text, an image, and/or a software object. In another exemplary embodiment, a Create STAMP Plan from the Inspection prompt 1422 can be displayed to determine whether the STAMP system 200 should transition from inspection capture to capital planning. If "yes" is selected, in one exemplary embodiment, the inspection responses and prompts can be stored into an inspection record and passed to a capital planning screen can be instantiated. The inspection record can include a header or mete-data indicating the date of the record creation and the name of the creator, among other relevant data. In another exemplary embodiment, the inspection record can be uploaded to a database if "yes" is selected. If "no" is selected, in another exemplary embodiment, the inspection responses and prompts can be stored into an inspection record with no capital planning screen instantiated. A comments prompt 1424 can be displayed on the client to capture any relevant notes related to the inspection. For example, any received comments can be stored in the inspection record. In one exemplary embodiment, if a STAMP plan is to be created from the inspection, the processor can display a prompt to determine the maintenance activity 1426. For example, the maintenance activity can be relay-wood or gauge, among other relevant activities. In another exemplary embodiment, if a relay-wood maintenance activity is received, the networked processor can display additional prompts related to that maintenance activity, such as Select the Relay Reason Code 1428, Enter Budget Year 1430, Funding Code 1432, and Comments 1434, among other relevant prompts.

With regard to FIG. 14E, there is shown a Picture screen 1440. In one exemplary embodiment, the Picture screen 1440 can include one or more icons that can instantiate one or more processes or algorithms. An icon can include text, an image, and/or a software object. In another exemplary embodiment, the networked processor can display one or more picture prompts 1442 to upload one or more images related to the inspection. With regard to FIG. 14F, once all of the inspection data has been received, the networked processor can display an alert 1436 related to the inspection. In one exemplary embodiment, the alert 1436 can display a save prompt to a user to determine whether the processor should save the inspection to an inspection record in the database. In another exemplary embodiment, the alert 1436 can be displayed in a window that overlays at least a portion of the client display. The display underneath the window can be grayed out to highlight the importance of the alert.

With regard to FIG. 14G, once an inspection is completed, the workflow can return to the Home (dashboard) screen 1100. In one exemplary embodiment, the Home screen 1100 can include a label 1412 to categorize various inspections and/or capital plans. For example, the label 1412 can include a listing of recently worked assignments, future assignments, and current assignments, among other relevant categories. For an assignment (e.g., inspection, plan, etc.) that was recently worked, under the RECENTLY WORKED label 1112, the Home screen 1100 can display a status 1114, a project description 1116, a timestamp 1118, a task ID, a location, or other relevant information related to the assignment. In another exemplary embodiment additional assignments can be displayed in the Home screen 1100. For example, a second assignment that was recently worked, under the RECENTLY WORKED label 1112, the Home screen 1100 can display a status 1438, a project description 1440, a timestamp 1442, a task ID, a location, or other relevant information related to the assignment. In another exemplary embodiment, the Home screen 1100 can include an Upload All icon 1119 that can facilitate the transfer of one or more assignments to a database. The Upload All icon 1119 can instantiate the Authentication module 126 to facilitate data transfer.

The present disclosure achieves at least the following advantages:

1. improves organization and accessibility of asset inspections and maintenance, among other technological improvements;
2. increases the efficiency of asset inspections and inspectors via improved systems that can add and modify prompts based on responses;
3. provides a unified platform for facilitating railroad asset inspections; and
4. provides centralized and accessible data models and criteria for assets throughout the railroad infrastructure, enabling faster and more-informed decision making.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A strategic track and maintenance planning inspection system for managing railroad infrastructure inspection records, comprising one or more computer processors configured to:
    generate a user interface displayable on a client for inputting, receiving, and selecting one or more attributes related to a railroad infrastructure asset inspection;
    receive a location of the client;
    automatically determine one or more asset parts for the railroad infrastructure asset inspection based at least in part on the client location;
    retrieve one or more models associated with the railroad infrastructure asset, wherein the one or more models associated with the railroad infrastructure asset include asset data associated with the railroad infrastructure asset and a plurality of parts of the railroad infrastructure asset, wherein the asset data includes one or more of asset characteristics, criteria, standards, and requirements for the railroad infrastructure asset;
    generate, based on the one or more models associated with the railroad infrastructure asset, a plurality of step-wise inspection prompts, wherein each of the plurality of step-wise inspection prompts is dynamically selectable based on at least the location of the client and the plurality of parts of the railroad infrastructure asset;
    transmit the plurality of step-wise inspection prompts to the client to initiate the railroad infrastructure asset inspection;
    receive, from the client, inspection data responsive to the plurality of step-wise inspection prompts, the inspection data including measurements indicative of one or more conditions of the railroad infrastructure;
    update the one or more models associated with the railroad infrastructure asset to include dynamically adjustable thresholds configured to:
        define one or more of maintenance-related decision criteria, inspection parameters, and replacement guidelines for one or more parts of the railroad infrastructure asset;
        adjust based on changes in one or more railroad-specific criteria including one or more of: historical usage data, environmental conditions, traffic load, wear indicators, and operational constraints; and
        update based, at least in part, on the inspection data to ensure that the one or more of asset characteristics, criteria, standards, and requirements for the railroad infrastructure asset include actual railroad asset conditions over time;
    adjust one or more of subsequent step-wise inspection prompts, maintenance schedules, and asset replacement recommendations based on the dynamically adjustable thresholds; and
    generate, capture, or finalize the railroad infrastructure asset inspection in accordance with the dynamically adjustable thresholds.

2. The system of claim 1, wherein the railroad infrastructure asset is a rail, ballast, panel, tie, turnout, or facility.

3. The system of claim 1, wherein the client includes a GPS radio configured to receive GPS signals and determine the location of the client using the received GPS signals.

4. The system of claim 1, wherein the plurality of step-wise inspection prompts include one or more criteria.

5. The system of claim 1, wherein the asset determines the plurality of step-wise inspection prompts to transmit to the client.

6. The system of claim 1, wherein the plurality of step-wise inspection prompts include at least one question and associated data field customized for the asset.

7. The system of claim 1, wherein the one or more models include one or more of relevant parts and criteria for the asset.

8. A method of managing railroad infrastructure inspection records, comprising:
- generating, via a processor, a user interface displayable on a client for inputting, receiving, and selecting one or more attributes related to a railroad infrastructure asset inspection;
- receiving a location of the client via a geopositioning module;
- automatically determining, via the processor, one or more asset parts for the railroad infrastructure asset inspection based at least in part on the client location;
- retrieve one or more models associated with the railroad infrastructure asset, wherein the one or more models associated with the railroad infrastructure asset include asset data associated with the railroad infrastructure asset and a plurality of parts of the railroad infrastructure asset;
- generating, based on the one or more models associated with the railroad infrastructure asset, a plurality of step-wise inspection prompts, wherein the asset data includes one or more of asset characteristics, criteria, standards, and requirements for the railroad infrastructure asset, wherein each of the plurality of step-wise inspection prompts is dynamically selectable based on at least the location of the client and the plurality of parts of the railroad infrastructure asset;
- transmitting the plurality of step-wise inspection prompts to the client to initiate the railroad infrastructure asset inspection;
- receiving, from the client, inspection data responsive to the plurality of step-wise inspection prompts, the inspection data including measurements indicative of one or more conditions of the railroad infrastructure;
- updating the one or more models associated with the railroad infrastructure asset to include dynamically adjustable thresholds configured to:
  - define one or more of maintenance-related decision criteria, inspection parameters, and replacement guidelines for one or more parts of the railroad infrastructure asset;
  - adjust based on changes in one or more railroad-specific criteria including one or more of: historical usage data, environmental conditions, traffic load, wear indicators, and operational constraints; and
  - update based, at least in part, on the inspection data to ensure that the one or more of asset characteristics, criteria, standards, and requirements for the railroad infrastructure asset include actual railroad asset conditions over time;
- adjusting one or more of subsequent step-wise inspection prompts, maintenance schedules, and asset replacement recommendations based on the dynamically adjustable thresholds; and
- capturing the railroad infrastructure asset inspection in accordance with the dynamically adjustable thresholds.

9. The method of claim 8, wherein the railroad infrastructure asset is a rail, ballast, panel, tie, turnout, or facility.

10. The method of claim 8, wherein the client includes a GPS radio configured to receive GPS signals and determine the location of the client using the received GPS signals.

11. The method of claim 8, wherein the plurality of step-wise inspection prompts include one or more criteria.

12. The method of claim 8, wherein the asset determines the plurality of step-wise inspection prompts to transmit to the client.

13. The method of claim 8, wherein the plurality of step-wise inspection prompts include at least one question and associated data field customized for the asset.

14. The method of claim 8, wherein the one or more models include one or more of relevant parts and criteria for the asset.

* * * * *